(12) United States Patent
Balardeta et al.

(10) Patent No.: US 7,942,762 B2
(45) Date of Patent: *May 17, 2011

(54) GPS DEVICE

(75) Inventors: Joseph Balardeta, Encinitas, CA (US); Scott Denton, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,369

(22) Filed: Mar. 9, 2010

(65) Prior Publication Data
US 2010/0311523 A1    Dec. 9, 2010

Related U.S. Application Data

(60) Provisional application No. 61/184,664, filed on Jun. 5, 2009.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........ 473/407; 701/213; 701/208; 701/212; 342/357.08; 395/773; 395/133; 395/779; 345/764; 340/995

(58) Field of Classification Search .................... 473/407
See application file for complete search history.

(56) References Cited

U.S. PATENT DOCUMENTS

| | | |
|---|---|---|
| 3,898,437 A | 8/1975 | Butler |
| 4,367,526 A | 1/1983 | McGeary et al. |
| 4,419,655 A | 12/1983 | May |
| 4,764,666 A | 8/1988 | Bergeron |
| 4,910,677 A | 3/1990 | Remedio et al. |
| 5,043,889 A | 8/1991 | Lucey |
| 5,095,430 A | 3/1992 | Bonito et al. |
| 5,127,044 A | 6/1992 | Bonito et al. |
| 5,214,757 A | 5/1993 | Mauney et al. |
| 5,245,537 A | 9/1993 | Barber |
| 5,261,820 A | 11/1993 | Slye et al. |
| 5,271,034 A | 12/1993 | Abaunza |
| 5,319,548 A | 6/1994 | Germain |
| 5,326,095 A | 7/1994 | Dudley |
| 5,364,093 A | 11/1994 | Huston et al. |
| 5,434,789 A | 7/1995 | Fraker et al. |
| 5,438,518 A | 8/1995 | Bianco et al. |
| 5,469,175 A | 11/1995 | Boman |
| 5,507,485 A | 4/1996 | Fisher |
| 5,524,081 A | 6/1996 | Paul |

(Continued)

OTHER PUBLICATIONS

The Wire, "uPro™ Most advanced, visually dynamic GPS system debuts at 2008 PGA Show", (2 pages), Jan. 7, 2008e.*
uPro™ Golf GPS User Guide (v1.1), uPlay LLC (30 pages), 2008 ©.*
Callaway Press Release, "Callaway Golf Announces Acquisition of uPlay", (2 pages), Jan. 5, 2009.*
Qwowi Golf, "uPro™ Set to, ale your GPS Golf Rangefinder Obsolete", (2 pages), Feb. 25, 2008.*

(Continued)

*Primary Examiner* — Paul A. D'Agostino
(74) *Attorney, Agent, or Firm* — Michael A. Catania; Sonia Lari

(57) ABSTRACT

A golf GPS device is disclosed herein. The device includes a GPS unit, a memory for storing a plurality of aerial images of a golf course, a display for displaying the plurality of aerial images, a user input for inputting a plurality of location points on an aerial image of the plurality of aerial images displayed on the display, and a processor comprising means for collision avoidance of features on the display of the device.

4 Claims, 17 Drawing Sheets

U.S. PATENT DOCUMENTS

| | | | |
|---|---|---|---|
| 5,528,248 A | 6/1996 | Steiner et al. | |
| 5,528,518 A | 6/1996 | Bradshaw et al. | |
| 5,558,333 A | 9/1996 | Kelson et al. | |
| 5,664,880 A | 9/1997 | Johnson et al. | |
| 5,685,786 A | 11/1997 | Dudley | |
| 5,689,431 A | 11/1997 | Rudow et al. | |
| 5,689,717 A * | 11/1997 | Pritt | 715/234 |
| 5,699,244 A | 12/1997 | Clark, Jr. et al. | |
| 5,740,077 A | 4/1998 | Reeves | |
| 5,772,534 A | 6/1998 | Dudley | |
| 5,779,566 A | 7/1998 | Wilens | |
| 5,797,809 A | 8/1998 | Hyuga | |
| 5,802,492 A | 9/1998 | DeLorme et al. | |
| 5,810,680 A | 9/1998 | Lobb et al. | |
| 5,835,896 A | 11/1998 | Fisher et al. | |
| 5,873,797 A | 2/1999 | Garn | |
| 5,878,369 A | 3/1999 | Rudow et al. | |
| 5,882,269 A | 3/1999 | Lewis | |
| 5,904,727 A | 5/1999 | Prabhakaran | |
| 5,949,679 A | 9/1999 | Born et al. | |
| 6,029,121 A | 2/2000 | Stashko | |
| 6,062,991 A | 5/2000 | Moriarty et al. | |
| 6,111,541 A | 8/2000 | Karmel | |
| 6,171,199 B1 | 1/2001 | Cohodas et al. | |
| 6,263,279 B1 * | 7/2001 | Bianco et al. | 701/213 |
| 6,456,938 B1 | 9/2002 | Barnard | |
| 2008/0293464 A1 * | 11/2008 | Cheng et al. | 463/3 |
| 2008/0293488 A1 * | 11/2008 | Cheng et al. | 463/31 |

OTHER PUBLICATIONS

Golf Nomad, "GPS devices galore . . . uPro", (2 pages), Apr. 22, 2008.*

In The Hole ! Golf, "uPro Golf GPS" (include screen shots of product demo), (4 pages), Apr. 26, 2008.*

Qwowi Golf, "uPro™ Golf GPS Course Download Pricing Finalized", (2 pages), May 2, 2008.*

Golf Channel, "uPro GPS", (2 pages), Mar. 27, 2008.*

The Wire, "uPro GPS system blows away competition at PGA Show", (1 page), Feb. 13, 2008.*

The Wire, "Visually dynamic uPro GPS systems debuts at 2008 PGA Show Booth #3219", (1 page), Jan. 11, 2008.*

Golden Eagle Golf, uPro™ Product Info, USPTO web archive (Wayback machine), (7 pages), Jul. 14, 2008.*

Qwowi Golf, uPro Golf GPS Revealed (with Photos), (2 pages), May 7, 2008.*

* cited by examiner

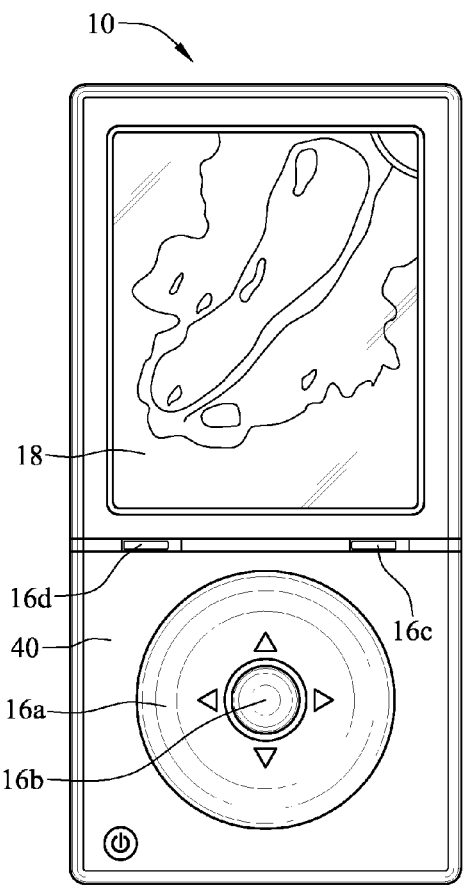
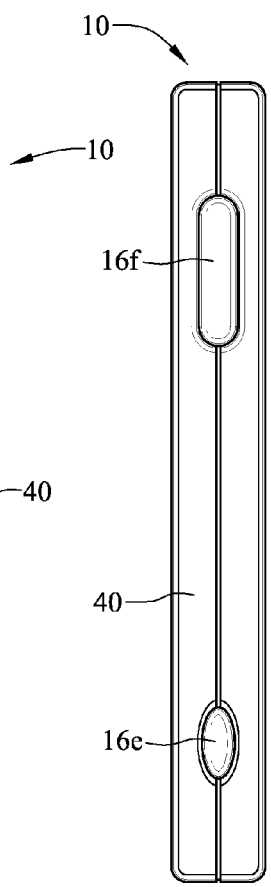
FIG. 2A  FIG. 2B  FIG. 2C
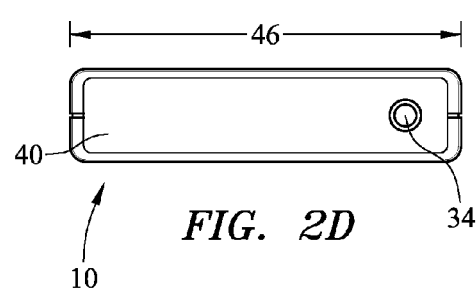
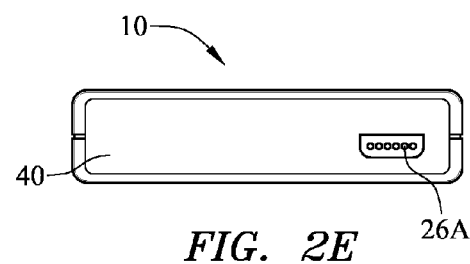
FIG. 2D  FIG. 2E

GPS DEVICE

CROSS REFERENCES TO RELATED APPLICATIONS

The Present Application claims priority to U.S. Provisional Patent Application No. 61/184,664 filed Jun. 5, 2009.

STATEMENT REGARDING FEDERALLY SPONSORED RESEARCH OR DEVELOPMENT

Not Applicable

BACKGROUND OF THE INVENTION

1. Field of the Invention

The field of the invention generally relates to electronic devices which utilize the global positioning system ("GPS") to determine locations and distances, and more particularly to a GPS device for determining distances to features on a golf course, and displaying the distances to features, golf course images, and/or other golf related data. The invention also relates to systems and methods for supporting such a GPS device.

2. Description of the Related Art

Various golf GPS devices, both handheld and golf cart-mounted, have been previously disclosed and described in the prior art. Generally, these devices comprise a GPS receiver and processing electronics (the "GPS system"), a display such as a liquid crystal display ("LCD") or cathode ray tube ("CRT"), and a user input device such as a keypad. Golf course data is input and stored in the golf GPS device, including for example, the coordinates for locations of greens, bunkers and/or other course features. These types of devices use the GPS system to determine the location of the device. Then, the device calculates and displays the distances to the various golf course features, such as the distance to the front, middle and back of the green, or the distance to a bunker or water hazard. Accordingly, by placing the device at or near the golfer's ball, the device can relatively easily and accurately provide the golfer with important distance information usable while playing golf. For example, the distance information is used by the golfer to formulate strategy for playing a hole (sometimes called "course management") and for club selection.

As an example of a golf GPS device, U.S. Pat. No. 5,507,485 ("the '485 patent"), which is hereby incorporated by reference herein in its entirety, purports to disclose a golf GPS device which can display depictions of a golf hole including multiple, selectable views of each hole such as the approach to the green and the green itself. The '485 patent describes that the device is configured to automatically determine the location of the device using a GPS receiver and then automatically display the golf hole view that would be of immediate interest to the golfer. Although the '485 patent discloses that the distance to displayed features may be indicated on the display, there is no description of how or where such information is displayed. The '485 patent also describes that the device may include other features such as means for receiving climate (i.e. temperature and humidity) and weather (i.e. wind speed and direction) conditions, means for recording and computing scores, bets and handicaps, means for recording details of a golf game sufficient to later replay and analyze a round of golf, means for suggesting shot and club selections to the golfer, clubs used and distances obtained for shots, and means for updating daily tee and hole positions on a removable integrated circuit ("IC") card. The course data for each particular course is also described as being stored on removable IC cards which are interchangeable between a host computer and the golf computer.

However, the '485 patent does not describe how the course data is generated, or how daily tee and hole positions are determined. The means for updating and supplying course data through removable IC cards which are programmed on a host computer and then inserted into the golf computer is clumsy and inconvenient. Moreover, the '485 patent only describes a cart-based golf computer, and although the '485 patent suggests that portions of the device (the display and input means) could be implemented on a handheld unit such as the Apple Computer Company's NEWTON™, there is no enabling disclosure of a fully integrated, standalone, handheld golf GPS device.

U.S. Pat. No. 6,456,938 ("the '938 patent"), which is hereby incorporated by reference herein in its entirety, describes a handheld golf GPS device. The handheld device is described as software executed on a palm-held computer (PC) saddled into and connected directly to a dGPS (differential global positioning system or differential GPS) receiver. The handheld device of the '938 patent has a modular construction comprising a dGPS receiver module which receives and accommodates a display module. The display module is described as being any of a variety of handheld, multifunctional computing devices having a display screen and a processor running an operating system. Suitable display modules disclosed include Personal Data Assistants (PDAs), such as a Pocket PC, Palm™ PDA, or similar palm held computing device. The screen is split into two distinct sections, a course display section for displaying a graphic representation of an area of a golf course, and a separate data and menu display section for displaying touch sensitive menu buttons and data (including distances). In the disclosed embodiment, the majority of the screen includes the first section, and a thin, left column of the screen shows a vertical menu column of touch sensitive menu buttons and data, such as distances.

The '938 patent also describes that the handheld golf GPS device could be constructed so that the modules are integrated into one unit, but does not describe the construction of such an "integrated" unit in any detail.

The '938 patent describes various functionality of the handheld golf GPS device, methods of creating golf course maps, and methods of distributing the golf course maps to the handheld golf GPS devices. For example, to use the device of the '938 patent during a round of golf, course data is first loaded onto the device. This may be accomplished by mapping the course using the device and using that course data file, as discussed below, or by connecting the device to a personal computer (PC) or directly to an internet connection and downloading the course data file onto the device. There is a setup menu for setting player preferences such as: club selection and data gathering; lie and stroke tracking enabled/disabled; marking of green strokes; and setting the green reference point, system units, and course, tee and starting hole selections. Once the course, tee and starting hole have been selected, the device displays a graphical (icon) representation of the selected hole, and certain distances to features whose locations are pre-stored in the course data file is displayed only in the data and menu section of the display. For example, the distance to the center of the green may be displayed in one of the boxes in the data and menu section of the display. The graphical representation includes simple icons for various features to be shown on the display, as shown in FIG. 29 of the '938 patent. At any time, the location of the device is determined using the dGPS receiver.

The device of the '938 patent also includes a club selection feature, in which the average distance for the player's clubs is displayed for each shot during play. The device also includes features for distance measuring from the location of the device to a target marked on the display by the user. Another described feature of the device is a shot tracking method which allows the user to store the location of each shot and the club used for the stroke at such location. Several other features are described in the '938 patent, including display functions such as pan and zoom, score keeping, statistics tracking, and the ability to upload game shot data to a web site or PC and then view a replay of a round with the speed of replay being adjustable.

Another example of a handheld golf GPS device is the Skycaddie™ line of devices from Skygolf®. At present, there are four models of Skycaddies with various levels of functionality and features. Like the devices described in the '485 patent and the '938 patent, the golf course data is loaded into the Skycaddie device. As described by Skygolf, the golf course data is generated by mapping each course on the ground using GPS and survey equipment. The database of golf course data is accessible through the internet on Skycaddie's website. The golf course data is downloaded onto a PC and then may be loaded onto the Skycaddie device by connecting the device to the PC. In addition, the Skycaddie devices allow a user to map a course, or additional course features, in the event a course or feature of interest is not included in the Skygolf database.

Another example of a handheld golf GPS device is the Skycaddie™ line of devices from Skygolf®. At present, there are four models of Skycaddies with various levels of functionality and features. Like the devices described in the '485 patent and the '938 patent, the golf course data is loaded into the Skycaddie device. As described by Skygolf, the golf course data is generated by mapping each course on the ground using GPS and survey equipment. The database of golf course data is accessible through the internet on Skycaddie's website. The golf course data is downloaded onto a PC and then may be loaded onto the Skycaddie device by connecting the device to the PC. In addition, the Skycaddie devices allow a user to map a course, or additional course features, in the event a course or feature of interest is not included in the Skygolf database.

Certain models of the Skycaddies may also display an outline of the green for a selected hole with the distances to the front, center and back of green displayed to the side of the displayed outline. Some models also display an icon representation of certain features, such as a creek, bunker or green, in one section of the display and the distances to such features in a different section of the display next to the icons. The Skycaddie devices can only measure distance to locations which are not pre-stored in the course data by marking a starting location and then moving the device to the measured location and marking the ending location. The device will then display the distance between the two locations. However, this requires walking all the way to the measured location. The Skycaddie devices are configured to automatically advance to the next hole of play based on the location of the device.

However, none of the previously described golf GPS devices provides a convenient, pocket-sized form factor, a high-resolution color display capable of displaying photographic images of a golf course, flexible calibration to improve accuracy, or the functionality and ease of use to take full advantage of such features. Accordingly, there is a need for an improved golf GPS device which overcomes the deficiencies and drawbacks of previous devices and systems.

On small consumer electronics displays, text readability is a significant challenge. This is true for both small and large font sizes when displaying a large amount of data on the screen. In the case of dynamic content being displayed on the screen, where users have the ability to change how they are viewing the data while the data itself is changing, it is especially important to be able to manage how that data is being displayed. Maintaining on-screen readability with very limited screen space in this environment is an issue that all vendors deal with in one way or another.

Specifically with golf GPS, the display deals with distances and other graphics overlayed on some form of representation of the golf hole/course. There are many competitors in this space—most of which deal with this scenario by having fixed fields where the distances get updated. Several simply have text distances with defined fields or a variable listing of distances which gets lengthened or shortened depending on the number if items which need to be displayed. There are also solutions which overlay distances onto a graphical representation of the hole.

One competing solution simply lines up the distances on the side of the display area and draws lines out to roughly where the measurement point applies. There are several disadvantages to this approach, some of which are a confusing relationship between distances and measurement points, as well as a decreased capability to precisely depict the measurement point.

Another approach is to simply not display data relating to features on the course, and only allow the user to select their own measurement points. This has the obvious disadvantage of required interaction from the user, and lack of speed in getting information.

BRIEF SUMMARY OF THE INVENTION

The approach of the present invention is to display yardage and measurement point indicators directly overlayed on the course imagery. Selection of measurement points is dynamic based on where the user is currently located so the distances and the measurement points are constantly moving. This requires a dynamic collision avoidance of text vs. other text, as well as versus the measurement points so that information is presented clearly. This is achieved by constantly checking the location of a given text versus all elements in the vicinity. These checks determine if there are any location changes required for the current piece of text. It can also determine that there is not a suitable location for the text, in which case it does not get displayed, and the measurement marker is changed to reflect this. This is done in a priority order so that the most important information is always displayed. The algorithms for determining the text location are outlined below.

The present invention comprises a portable golf GPS device and system which is simple, accurate, and easy to use, yet provides excellent functionality and features in a compact, lightweight form factor. The portable golf GPS device of the present invention generally comprises a microprocessor operably coupled to a GPS unit, an input device such as a keypad (or touch screen) operably coupled to the microprocessor, and a display such as a liquid crystal display ("LCD") operably coupled to the microprocessor. A program memory system which contains at least some of the software and data to operate the device is also operably coupled to the microprocessor. The device also comprises various firmware and software configured to control the operation of the device and provide the device functionality as described in more detail below. In addition, data utilized by the device, such as golf course data and images, may be stored in the program memory or other memory module such as Secure Digital memory card ("SD Card"), USB based memory devices, other types of flash memory, or the like.

For portability, the golf GPS device of the present invention is self-contained, compact and lightweight. For example, the device is preferably battery operated. The portable golf GPS device is preferably contained in a housing such that the entire device has a very compact and lightweight form factor, and is preferably handheld and small enough to fit comfortably in a pocket of a user's clothing. For example, the entire golf GPS device may be 4 inches long (4"), by 2 inches wide (2"), by 0.6 inches thick (0.6"), or smaller in any one or more of the dimensions. The entire golf GPS device may weigh 3.5 ounces or less, including the battery.

The microprocessor may be any suitable processor, such as one of the MX line of processors available from Freescale Semiconductor or other ARM based microprocessor. The GPS unit may be any suitable GPS microchip or chipset, such as the NJ1030/NJ1006 GPS chipset available from Nemerix, Inc. The LCD is preferably a high resolution (e.g. 320 pixels by 240 pixels, QVGA or higher resolution), full color LCD, having a size of about 2.2" diagonal The program memory may include one or more electronic memory devices on the golf GPS device. For example, the program memory may include some memory contained on the microprocessor, memory in a non-volatile memory storage device such as flash memory, EPROM, or EEPROM, memory on a hard disk drive ("hdd"), SD Card(s), USB based memory devices, other types of flash memory, or other suitable storage device. The program memory stores at least some of the software configured to control the operation of the device and provide the functionality of the golf GPS device.

The components of the portable golf GPS device are preferably assembled onto a PCB, along with various other electronic components used to control and distribute the battery power, thereby providing the electronic connections and operability for a functional electronic device.

The hardware and software of the portable golf GPS device are configured to determine, track, and display useful golf related information, before, during and after a round of golf For example, the GPS device is configured to store golf course data for a particular golf course of interest which is loaded onto the GPS device in any suitable manner. The golf course data includes geographic location coordinates for various golf course features, such as bunkers, greens, water hazards, tees, and the like. The golf course data may also include golf hole data such a par, handicap, daily tee and hole locations, etc. In addition, the golf course data may include photographic course images, such as satellite or aerial photographs and/or video images.

The use of the GPS device during play of a round of golf is referred to herein as "Play Golf" mode. In Play Golf mode, the basic functionality of the device is as follows. First, the golf course being played is selected on the GPS device, for example, from a list of courses displayed on the display. Then, the user should locate the GPS device at a location of play (e.g. the location of the user's ball, or a tee box). The GPS device determines the location of the device, and then displays various golf hole information on the display. For example, the device may display the number of the particular golf hole being played, par for the hole, the length of the hole, and the handicap of the hole. The device may also display information regarding the distance to various features of the golf hole being played and an identification of the type of feature. For example, the display may show the front and carry distance of bunkers, the front, middle and back of the green, the front and carry distance of water hazards, and the like.

In one innovative aspect of the present invention, the GPS device is configured to display the golf hole information in two distinct operating modes. In a first mode, also referred to herein as the Basic Mode, the distances and features are displayed in a text and/or icon format. This may be accomplished by simply displaying a list of features and respective distance(s) for each feature, such as "Right Fairway Bunker . . . 245-275" or an icon representing a fairway bunker next to the distance ". . . 245-275." This would indicate that there is a fairway bunker on the right, and is 245 yards to reach the bunker and 275 yards to carry the bunker. In a second mode, also referred to herein as the Pro Mode, the distances and features are shown on the display on a graphical image of a relevant area (also referred to as a "viewport") of the golf course. The graphical image is preferably a photographic image generated from geo-referenced (e.g. coordinates are available for any location on the image) satellite or aerial digital photographs, or geo-referenced generated images. Thus, the images of the features, such as bunkers, the green, water hazards, etc. are displayed in the photographic image and the distances are overlaid onto the image. In another feature of the present invention, a distance marker, such as a red dot or other small but easily viewable symbol, is placed on the feature at the exact point of measurement, and the distance number is displayed in the vicinity of the marker.

If the Pro Mode course data has been loaded onto the device, the device is configured such that it can toggle back and forth between the Pro Mode display and the Basic Mode display. However, if only the Basic Mode course data has been loaded onto the device, only the Basic Mode information may be displayed. While viewing a list of features in Basic Mode, a feature may be selected, such as by scrolling through the list of features, and the user may select to view the Pro Mode display of such feature simply by selecting the feature from the list and selecting the Pro Mode. Of course, this feature would only be available if the Pro Mode course data has been loaded onto the device. The golf course data set required to operate the device in the Pro Mode and the Basic Mode is the same, except that the Pro Mode data set includes the graphical images of the golf course. This simplifies the creation of the course databases because creation of the Pro Mode data set also creates the Basic Mode data set.

In another aspect of the present invention, the device includes an innovative automatic, dynamic, viewport generation method for optimizing the viewability of the distance and feature images in the Pro Mode. The viewport generation may include one or more of several methods to determine the displayed viewport. In one example, the viewport generation method may include a method of determining the location and scale of the image of the golf course to be displayed based on the location of the device (and therefore the location of play) and the characteristics of the golf hole. As an example, the method of viewport generation method may display a section of the golf hole that will be most relevant to the golfer from the current location, which may be a yardage range such as the next 150 to 250 yards of the golf hole. The method will automatically scale (i.e. set the zoom level) the graphic image of the relevant section of the hole so that it will fit on the display while maintaining viewability of relevant features (e.g. bunkers, the green, hazards) and informational text (e.g. yardages). If the hole happens to be a par 3, or there is less than a certain distance (e.g. 250 yards) to the end of the hole, then the viewport generation method may display the rest of the hole at a maximum zoom level that can fit the rest of the hole on the display.

In another method of viewport generation, the distances displayed may be adjusted to avoid overlapping. This method may also be referred to as collision management. At certain zoom levels, for example very low zoom levels, many features as displayed on the display may be very close together such that if all of the distances to these features are displayed the numbers will overlap and the readability of the information will be compromised. To avoid this, the method will not display some of the distances so as to avoid any overlapping distances.

In another aspect of the present invention, the GPS device is configured to provide panning and zooming of the displayed graphical images of the golf course with the distance overlays. In other words, when viewing any Pro Mode graphical display with distances overlaid onto features, the device is configured so that the user can pan the image to display the golf course outside the original viewport, and the distances remain overlaid at the correct locations next to their respective features. Similarly, when zooming in or out from a particular viewport, the distances again remain overlaid at the correct locations next to their respective features (or feature marker). In addition, when zooming and panning, the font size of the distances may be constant or set to display at a minimum font size, and the collision management methods described above may also be utilized.

In still another aspect of the present invention, the golf GPS device is configured to allow the measurement of the distance between locations on the golf course using the images displayed on the display. This is a useful feature which is enabled by the use and display of the actual photographic images of the golf course, and is very simple to use. For example, to measure the distance between the current location of the device and another location of interest as displayed on the display, the user simply selects the measurement mode, moves a cursor displayed on the display to the location of interest and then selects the location of interest. The device is configured to determine and display the distance between the coordinates of the current location of the device and the location of interest. In a similar manner, the device may also be configured to measure the distance between two locations of interest selected on display. In addition, the pan and zoom functions may be utilized automatically or manually during the measurement mode in order to select a location of interest. In other words, as the cursor reaches the edge of the viewing area, the image will pan to display a portion of the image that was previously outside the viewing area.

In yet another aspect of the present invention, the device is configured to perform an innovative calibration method. Like the measurement mode, this feature is enabled by the use and display of the actual photographic images of the golf course. To utilize this feature, the user locates a physical feature at the golf course which can also be fairly accurately identified and located on a graphical image of the same physical feature shown on the display of the GPS device. Several examples of good features for this calibration method are a cart path intersection, a distinctive shape of a bunker, a manhole cover, or a permanent tee marker. The device is then placed at the physical feature, and then the user places a cursor shown on the display of the device onto the image of the same physical feature. To improve the precision of the location of the cursor, the image of the feature may be zoomed in to a high zoom level or even the maximum zoom level. The device is configured to determine the offset between the apparent location measured by the GPS device and the location of the physical feature on the displayed image. The resultant offset may then be used to correct all future GPS readings. The positional errors in GPS due to pseudo-range errors in the GPS satellite system and environmental conditions are approximately equal within the period of time of a round of golf and over the area of a single golf course. Thus, a single calibration during a round of golf will usually be sufficient to account for inaccuracies due to environmental conditions and pseudo-range errors of GPS satellite system. Still, multiple calibrations during a single round of golf may be accomplished, if desired.

The GPS golf device of the present invention may also be configured to present a pre-round preview of a golf course, including a display of each hypothetical shot and/or suggested strategy. This allows the user to get a visual experience and strategize the course prior to playing.

Similarly, the device may be configured to track each shot during a round of golf, including the club used for each shot and other shot information (such as quality and condition of lie, degree of swing such as full shot, half shot, etc., quality of contact, ball flight, etc.). The device may also be configured to play back a round of golf which was tracked using the device, and/or download the tracked round to a computer or other device for playback and/or analysis.

In still another feature of the present invention, the golf GPS device may include voice recognition/navigation. The golf GPS device may be configured to allow a user to enter information using vocal inputs, such as shot information and scores. The voice recognition feature may also be used to audibly enter commands, such as switching between Basic Mode and Pro Mode, navigating through the devices menus, changing the settings, or any other command within the devices menus. Voice recognition facilitates the use of more advanced features, such as shot tracking, by reducing the amount of inputs that must be made using the input device. As an example, when entering a club selection for shot tracking, instead of having to scroll through a list of clubs, the user need only say "seven iron" or "driver."

Accordingly, a portable golf GPS device and system is provided. Additional aspects and features of the portable golf GPS device and system of the present invention will become apparent from the drawings and detailed description provided below.

BRIEF DESCRIPTION OF THE SEVERAL VIEWS OF THE DRAWINGS

FIG. 2 is a four view showing the front, left side, right side, top and bottom of a golf GPS device according to one embodiment of the present invention.

DETAILED DESCRIPTION OF THE INVENTION

Figure 1:
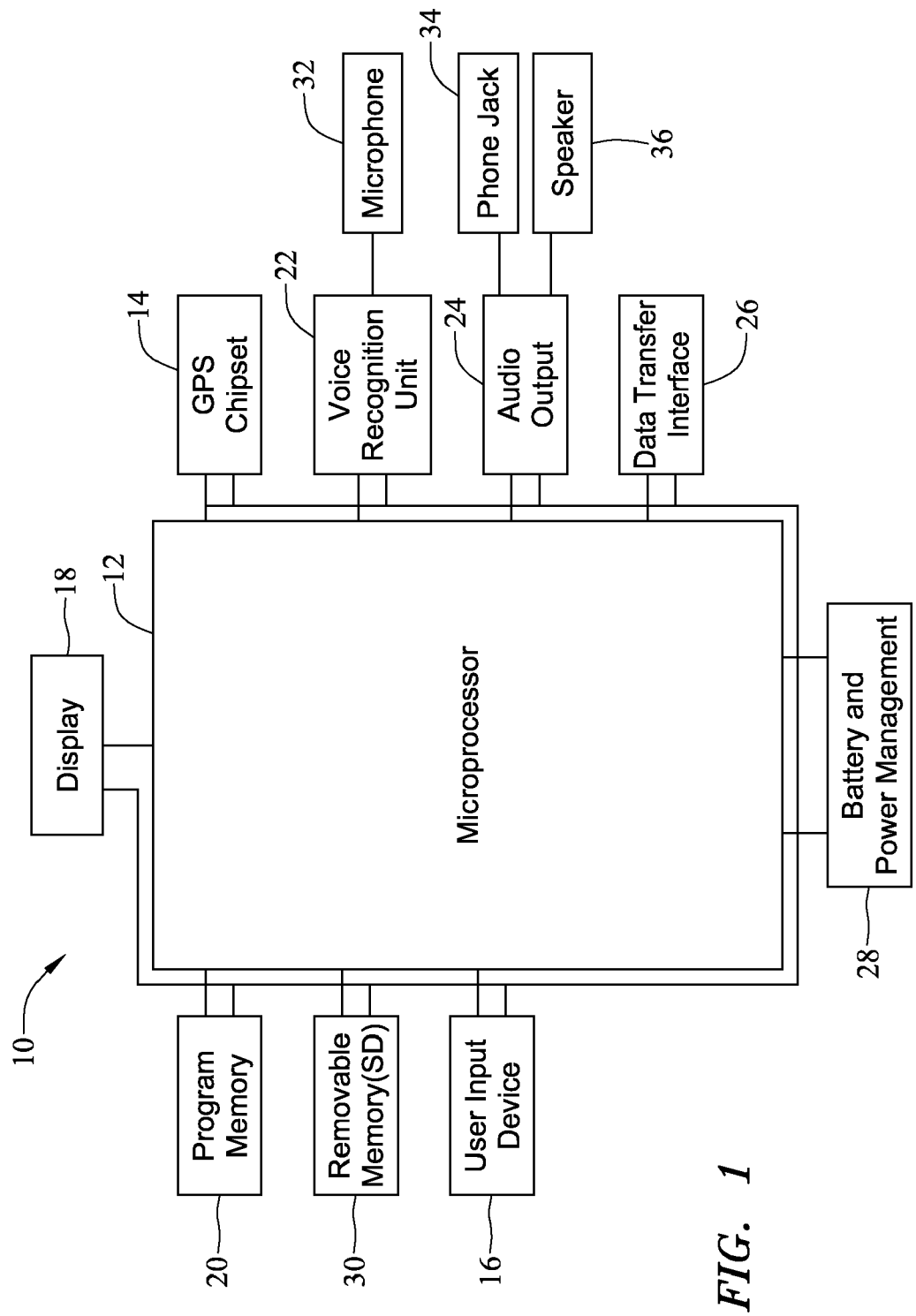
FIG. 1 is a schematic block diagram of a golf GPS device according to one embodiment of the present invention.

Referring to FIG. 1, a schematic block diagram of the major electronic components of a golf GPS device 10 according to one embodiment of the present invention will be described. The golf GPS device 10 comprises a microprocessor 12 which is operably coupled to a GPS chipset 14, a user input device 16, an LCD display 18; a program memory 20, a voice recognition module 22, an audio output 24, a data transfer interface 26, and a battery and power management unit 28. As understood by one of ordinary skill in the art, the device 10 also comprises other electronic components, such as passive electronics and other electronics configured to produce a fully functional GPS device as described herein. In addition, the device 10 comprises various firmware and software configured to control the operation of the device 10 and provide the device functionality as described in more detail below.

The microprocessor 12 is preferably an ARM based microprocessor, such as one of the MX line of processors available from Freescale Semiconductor, but may be any other suitable processor. The microprocessor 12 executes instructions retrieved from the program memory 20, receives and transmits data, and generally manages the overall operation of the GPS device 10.

The GPS chipset 14 is preferably an integrated circuit based GPS chipset which includes a receiver and microcontroller. The GPS chipset may be a single, integrated microchip, or multiple microchips such as a processor and a separate receiver which are operably coupled to each other (for example, on a printed circuit board ("PCB")). For instance, the GPS chipset 14 may be a NJ1030 GPS chipset available from Nemerix, Inc., or any other suitable GPS chipset or microchip. The GPS chipset includes a GPS receiver, associated integrated circuit(s), firmware and/or software to control the operation of the microchip, and may also include one or more correction signal receiver(s) (alternatively, the correction signal receiver(s) may be integrated into a single receiver along with the GPS receiver). As is well known, the GPS unit 14 receives signals from GPS satellites and/or other signals such as correction signals, and calculates the positional coordinates of the GPS unit 14. The GPS device 10 utilizes this positional data to calculate and display distances to features or selected locations on a golf course, as described in more detail below.

The display 18 may be any suitable graphic display, but is preferably a high resolution (e.g. 320 pixels by 240 pixels, QVGA or higher resolution), full color LCD. The display 18 is preferably the largest size display that can be fit into the form factor of the overall device 10, and preferably has a diagonal screen dimension of between about 1.5 inches and 4 inches. For example, for the form factor described below with reference to FIG. 2, the display may be a 2.2" diagonal, QVGA, full color LCD. In addition, since the display 18 is intended to be used outside under sunlit conditions, the display 18 should provide good visibility under brightly lit conditions, such as with a transflective LCD.

The program memory 20 stores at least some of the software and data used to control and operate the device 10. For example, the program memory 20 may store the operating system (such as LINUX or Windows CE), the application software (which provides the specific functionality of the device 10, as described below), and the golf course data. The program memory 20 broadly includes all of the memory of the device 10, including memory contained on the microprocessor, memory in a non-volatile memory storage device such as flash memory, EPROM, or EEPROM, memory on a hard disk drive ("hdd"), SD Card(s), USB based memory devices, other types of flash memory, or other suitable storage device, including one or more electronic memory devices on the golf GPS device, including an additional removable memory unit 30.

The user input device 16 may comprise a plurality of buttons, a touch screen, a keypad, or any other suitable user interface which allows a user to select functions and move a cursor. Referring to the embodiment shown in FIG. 2, an example of a user input device comprises a directional pad 16a and plurality of buttons 16b, 16c, 16d, 16e and 16f. The device 10 is configured such that directional pad 16a may be used to move a cursor around the display, while the buttons 16b-16f may be used to make selections and/or activate functions such as activating the voice recognition or switching between modes (as described in more detail below).

In order to provide portability, the golf GPS device 10 is preferably battery powered by a battery and power management unit 28. The battery may be any suitable battery, including one or more non-rechargeable batteries or rechargeable batteries. For instance, a rechargeable, lithium-ion battery would work quite well in this application, as it provides relatively long life on a single charge, it is compact, and it can be re-charged many times before it fails or loses significant capacity. The power management unit controls and distributes the battery power to the other components of the device 10, controls battery charging, and may provide an output representing the battery life. The power management unit may be a separate integrated circuit and firmware, or it may be integrated with the microprocessor 12, or other of the electronic components of the device 10.

The voice recognition unit 22 comprises electronics and software (the term "software" as used herein shall mean either software or firmware, or any combination of both software and firmware) configured to receive voice or other sounds and convert them into software commands and/or inputs usable by the main application software. The voice recognition unit 22 may comprise a separate integrated circuit, electronics and/or software, or it may be integrated into the main microprocessor 12. The voice recognition unit 22 includes a microphone 32. The voice recognition unit 22 is configured to detect voice and/or other sound inputs from a user of the device 10, and convert the sound inputs into electrical signals. The voice recognition unit 22 then digitizes the analog electrical signals and computes a command or other input representative of the digitized signal. For example, a command for switching between Pro Mode and Basic Mode may be input using the voice recognition unit 22 by speaking the term "Pro Mode" or "Basic Mode" into the microphone 32. Of course, the main application software must also be configured to receive the inputs from the voice recognition unit 22. The hardware and software for the voice recognition unit are relatively complex, but packaged solutions are available, such as the products available from Texas Instruments, Inc. or Wolfson Micro, Inc.

The audio output 24 comprises electronics and software to convert digital signals from the device into electrical signals for driving a speaker or headphones. The audio output 24 may comprise a phone jack 34 (also shown in FIG. 2) and/or a speaker 36. The audio output 24 typically includes a digital-to-analog converter, a power amplifier, and may also include software for converting information or data into audible sounds. For instance, the audio output 26 may be configured to convert distances measured by the device 10 into an audibly replicated voice of the distance in words, such as "one-hundred fifty." Additionally, the device 10 may be configured to also play digital music files (such as MP3 audio files) or digital video files (such as MPEG files), with the audio being output using the audio output 24.

The voice recognition unit 22 and audio output 24 may be integrated together into a software and hardware unit. For example, such integrated products are available from Texas Instruments, Inc. and Wolfson Micro, Inc.

The data transfer interface 26 is configured to send and receive data from a computer or other electronic device (e.g. another golf GPS device 10). The interface 26 may be a physical connection such as a USB connection, a radio frequency connection such as Wi-Fi, wireless USB, or Bluetooth, an infra-red optical link, or any other suitable interface which can exchange electronic data between the GPS device 10 and another electronic device. As shown in one preferred embodiment in FIG. 2, the interface 26 comprises a USB connection having a USB connector 26a.

The electronic components of the golf GPS device 10 are preferably assembled onto a PCB, along with various other electronic components and mechanical interfaces (such as buttons for the user input device 16), thereby providing the electronic connections and operability for a functional electronic GPS device 10.

Turning to FIG. 2 now, the golf GPS device 10 preferably comprises a housing 40 which houses the electronic components such that the entire device has a very compact, thin, and lightweight form factor. The housing 40 may be formed of any suitable material, but is preferably a plastic material which is substantially transparent to radio frequency signals from GPS satellites. Indeed, the golf GPS device is preferably handheld and small enough to fit comfortably in a pocket of a user's clothing. One example of the form factor for the GPS device 10 with dimensions is shown in FIG. 2. In one preferred form, the GPS device 10 may have the following dimensions: a height 44 of about 4 inches or less, a width 46 of 1.9 inches or less and a thickness 42 of 0.6 inches or less. More preferably, the height 44 is 3.9 inches or less, the width 46 is 1.8 inches or less, and the thickness 42 is 0.55 inches or less. The entire golf GPS device 10 may weigh about 3.5 ounces or less, including the battery 28.

An application software program is stored in the program memory 12. The application software program is configured to operate with the microprocessor 12 and the other electronic components to provide the golf GPS device 10 with the functionality as described herein. Most generally, the hardware and software of the portable golf GPS device 10 are configured to determine, track, and display useful golf related information, before, during and after a round of golf. The GPS device 10 is configured to store golf course data for a particular golf course of interest which is loaded onto the GPS device 10 through the data transfer interface 26.

The golf courses are mapped to create the golf course data using any suitable method, such as ground survey, or more preferably, by using geo-referenced satellite or aerial images. The mapping process produces golf course data which can be used by the GPS device 10 to determine the coordinates of golf course features of interest, such as the greens, bunkers, hazards, tees, pin positions, other landmarks, and the like. Generally, the perimeter of the golf course features will be mapped so that distance to the front and back of the feature may be determined. The mapping process can be done quickly and easily by displaying the geo-referenced images of the golf course on a computer and then using a script (or other software) each feature of interest is traced (or a series of discrete points on the perimeter may be selected). The captured data is then used to create a data set comprising the coordinates for a plurality of points on the perimeter of the feature, or a vector-map of the perimeter, or other data, which can be used to calculate the distance to such feature from the location of the GPS device 10. The golf course data preferably also includes golf hole data such as par, handicap, daily tee and hole locations, etc. In addition, for use with the "Pro Mode" as described below, the golf course data may include geo-referenced photographic course images, such as satellite or aerial photographs and/or video images. Indeed, the golf course data package for operating the device 10 in the Pro Mode and the Basic Mode is substantially the same, except that the Pro Mode data package includes the graphical images of the golf course. In other words, the golf course data related to the feature locations is exactly the same for both the Pro Mode and the Basic Mode, and the GPS device 10 is configured to utilize this data with or without the graphical images. Thus, advantageously, creation of the Pro Mode data package also creates the Basic Mode data set.

Figure 3:
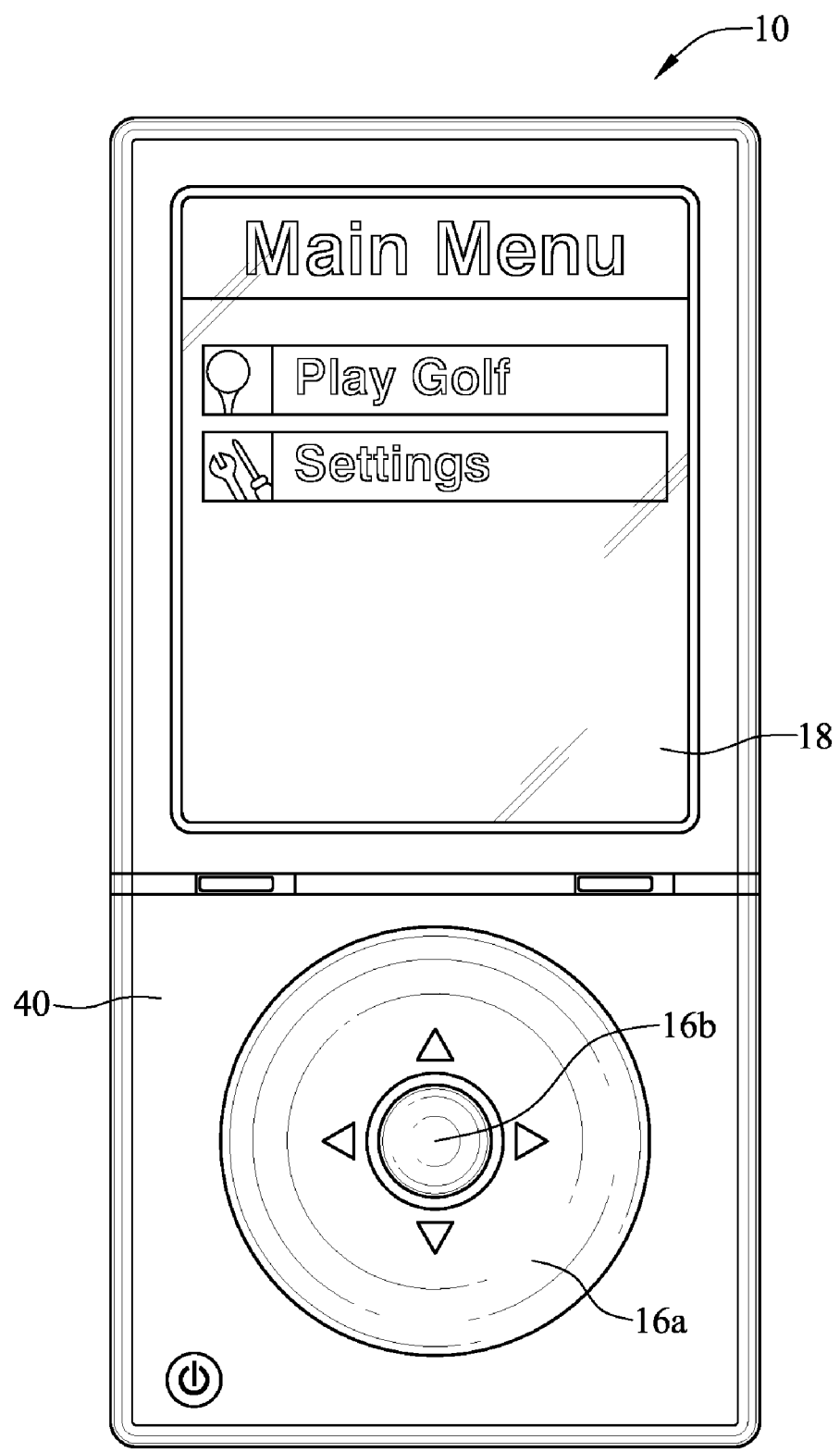
FIG. 3 is front, elevational view of a GPS device with a Main Menu displayed on the display according to one embodiment of the present invention.

With reference now to FIGS. 3-11, the operation and functionality of GPS device 10 according to one embodiment will be described. Referring to FIG. 3, a "Main Menu" screen is displayed on the display 18. The "Main Menu" screen has two options, "Play Golf" or "Settings." The choices on the Main Menu screen (or any of the other menus and screen displays described herein) can be selected by changing the highlighted option using the up and down arrows on the directional pad 16a of the user input device 16. The button 16b may function as an "Enter" key to make a selection. If a touch screen input device 16 is utilized, the user can simply touch the selection on the display 18.

Selecting "Settings" will bring up a "Settings" menu which allows the user to set various device and player settings and preferences. For example, the "Settings" menu may allow the user to set such user preferences as system units (e.g. yards or meters), preferred display settings (e.g. text size, Pro Mode vs. Basic Mode, screen brightness and contrast), turning on/off functions (such as score keeping, voice recognition, shot tracking, etc.), and other device settings.

Figure 4:
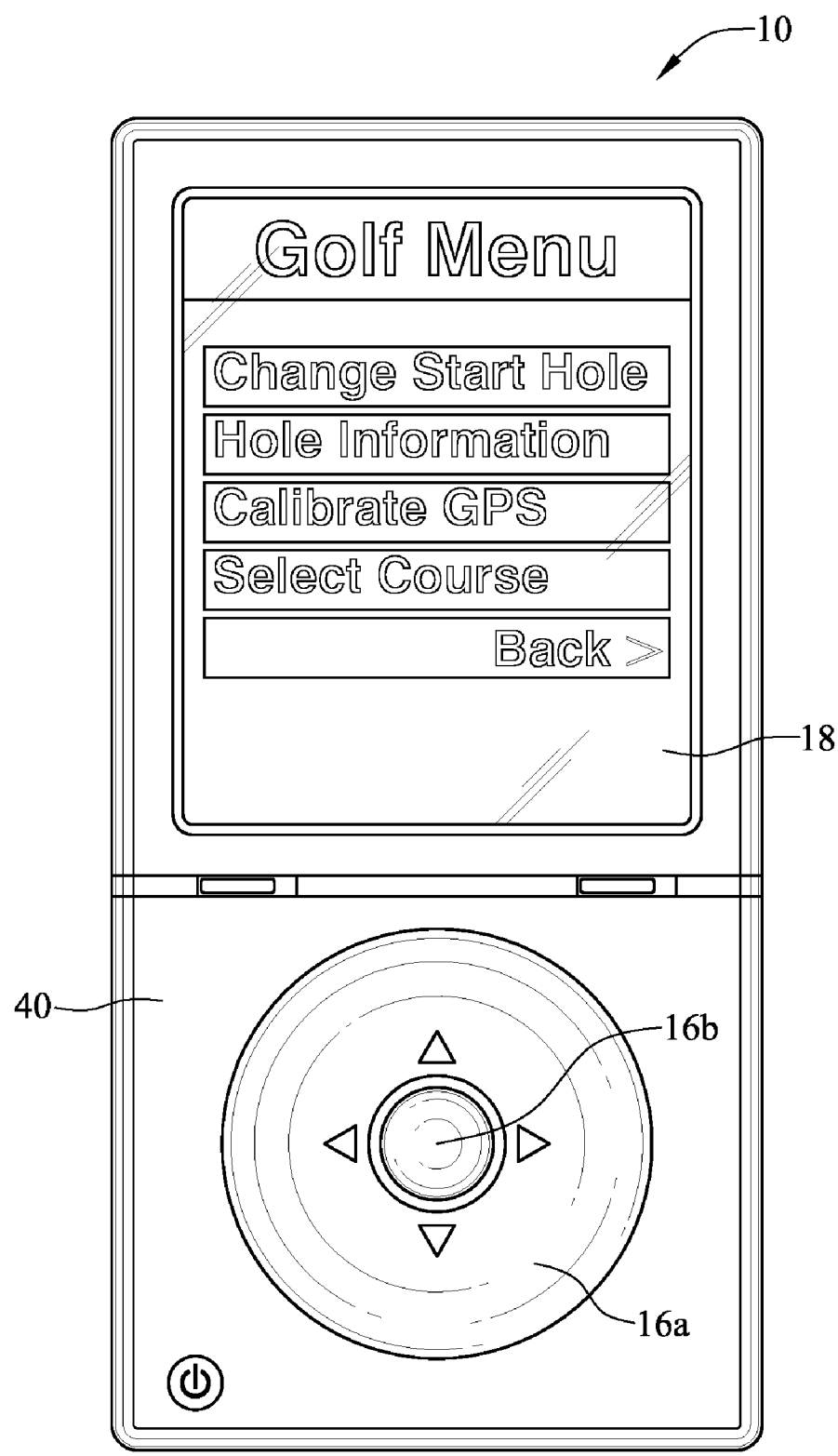
FIG. 4 is front, elevational view of a GPS device with a Golf Menu displayed on the display according to one embodiment of the present invention.

Selecting the "Play Golf" mode brings up a "Golf Menu" as shown in FIG. 4 for initializing the GPS device 10 for use during a round of golf. The course being played may be selected by selecting "Select Course" which may bring up a list of courses currently stored on the device 10. The list of courses shown can be determined based on the location of the device as determined by the GPS device 10, for example, a list of the two or three courses closest to the location of the device. Alternatively, the list can be generated as a simple alphabetical list, a list of favorites, or other suitable listing method. The "Golf Menu" also allows the user to choose the starting hole, for instance, if a player is going to start on a hole other than the 1st hole, such as starting on the 10th hole (the "back nine").

Figure 5:
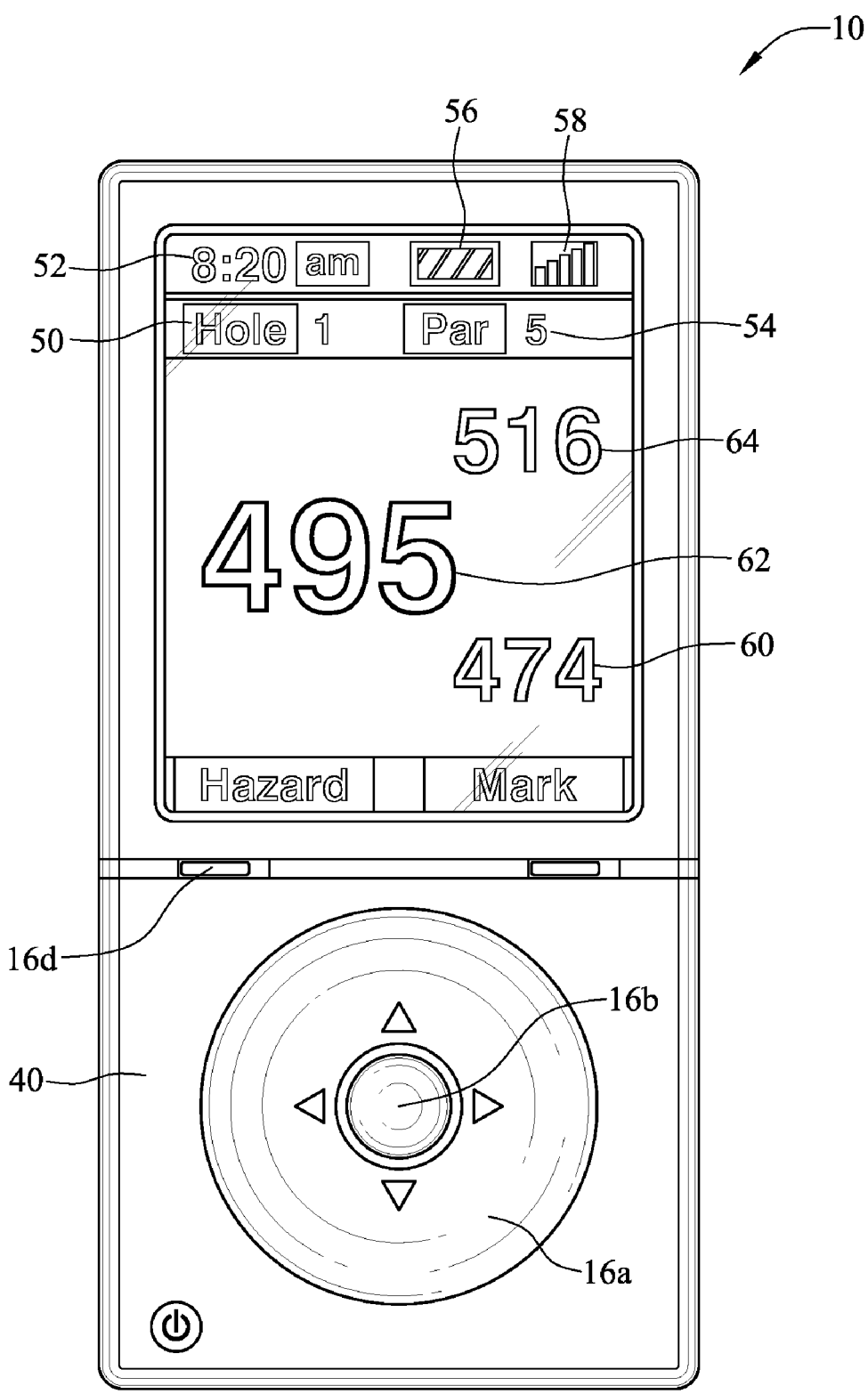
FIG. 5 is front, elevational view of a GPS device with golf hole information displayed on the display according to one embodiment of the present invention.

Once the course and starting hole have been selected, GPS device 10 determines the location of the device 10 using the GPS chipset 14, and then displays various golf hole information on the display. Turning to FIG. 5, in this described embodiment, the GPS device 10 is configured to display the hole number 50, the current time 52 (the device 10 may include a clock function which can be provided by the microprocessor 12, the GPS chipset 14, or other electronic device), the par for the hole 54, a battery charge indicator 56, and a GPS signal strength indicator 58. The GPS device 10 further calculates the distance between the determined location of the device 10 and the front, middle and back of the green and displays the distance to the front 60, the middle 62 and the back 64 of the green. As the device 10 is moved, the location of the device 10 is continually updated, and the distances (such as the front 60, middle 64, and back 64 of green) displayed are updated accordingly.

The GPS device 10 may also be configured to display a video flyover of the hole being played using a satellite or aerial photographic images of the hole. The GPS device 10 may be configured to automatically display the flyover when the device 10 detects that the GPS device 10 is approaching or has reached a particular hole, and/or the user can select to display the flyover using the menu-driven selections.

Figure 6:
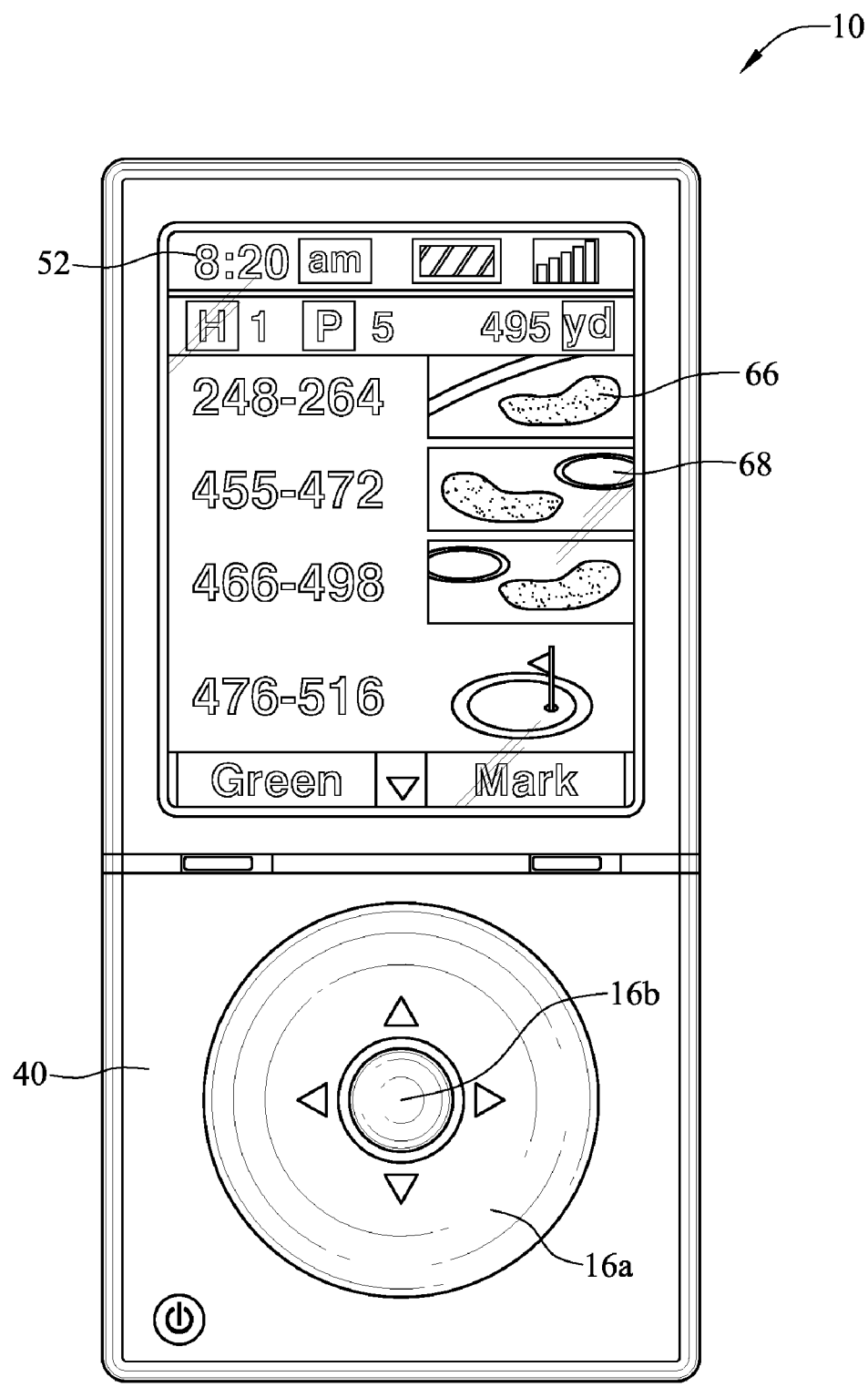
FIG. 6 is front, elevational view of a GPS device with a Hazard view in Basic Mode displayed on the display according to one embodiment of the present invention.

The golf GPS device 10 also may display the distances from the location of the device 10 to hazards and other features of interest as shown in FIG. 6. As an example, the user may select the "Hazard" selection on the display shown in FIG. 5 using the button 16*d* to bring up the screen as shown in FIG. 6. The screen shown in FIG. 6 displays the "Hazard" information in what is referred to herein as "Basic Mode." Basic Mode displays the "Hazard" information in a list using icons or text and respective measured distances. The example of FIG. 6 shows an icon for a right fairway bunker 66 and the distance to the front side of the bunker is 248 yards and the distance to carry the bunker is 264 yards. Similarly, the screen shows that the distance to the left greenside bunker 68 is 455 yards to reach and 472 yards to carry. Instead of easy to read icons, the features can alternatively be displayed using text, such as "Right Fairway Bunker" or using an abbreviation such as RtFwyBnkr, or the like.

Figure 7:
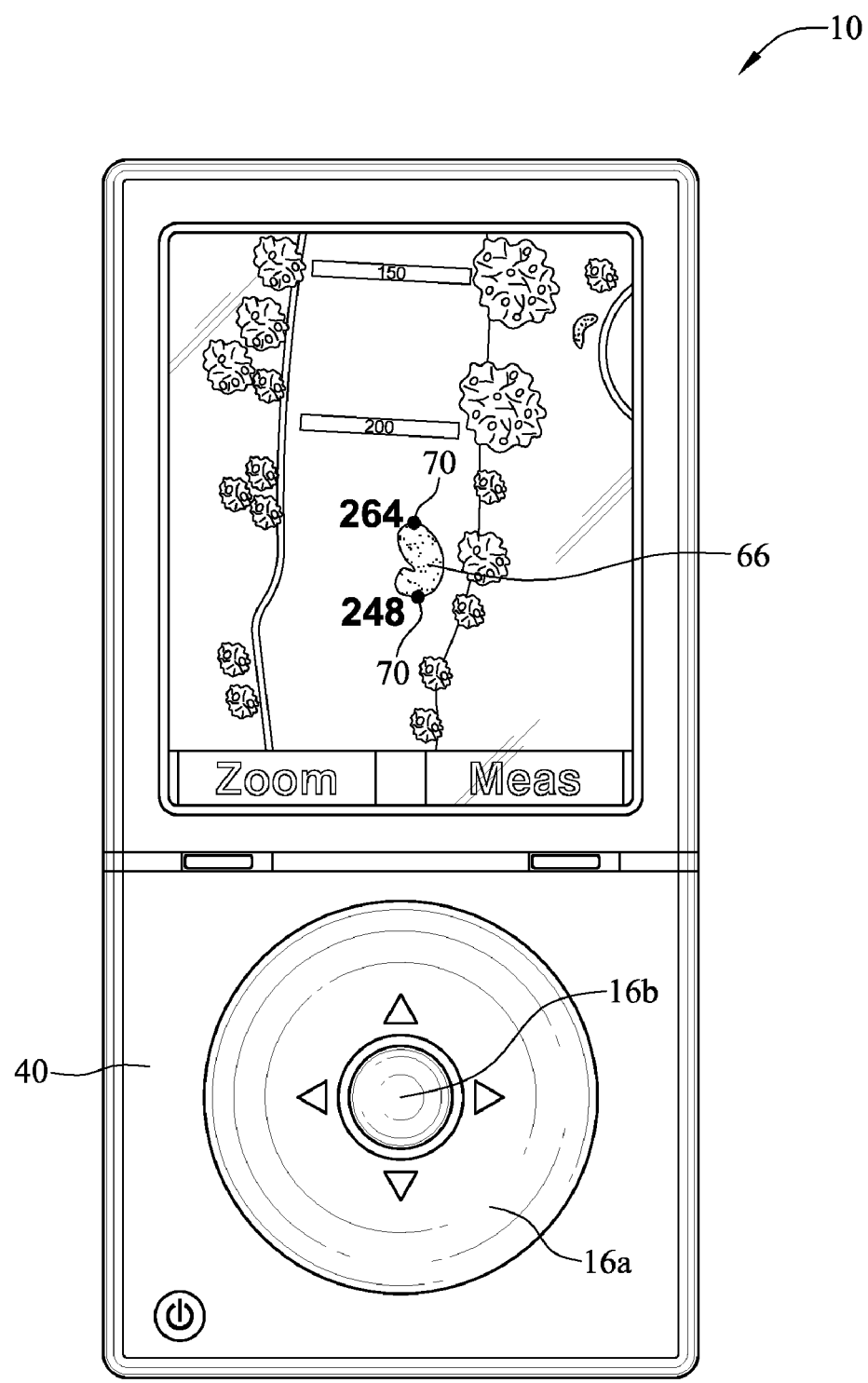
FIG. 7 is front, elevational view of a GPS device with a Pro Mode view displayed on the display according to one embodiment of the present invention.
Figure 8:
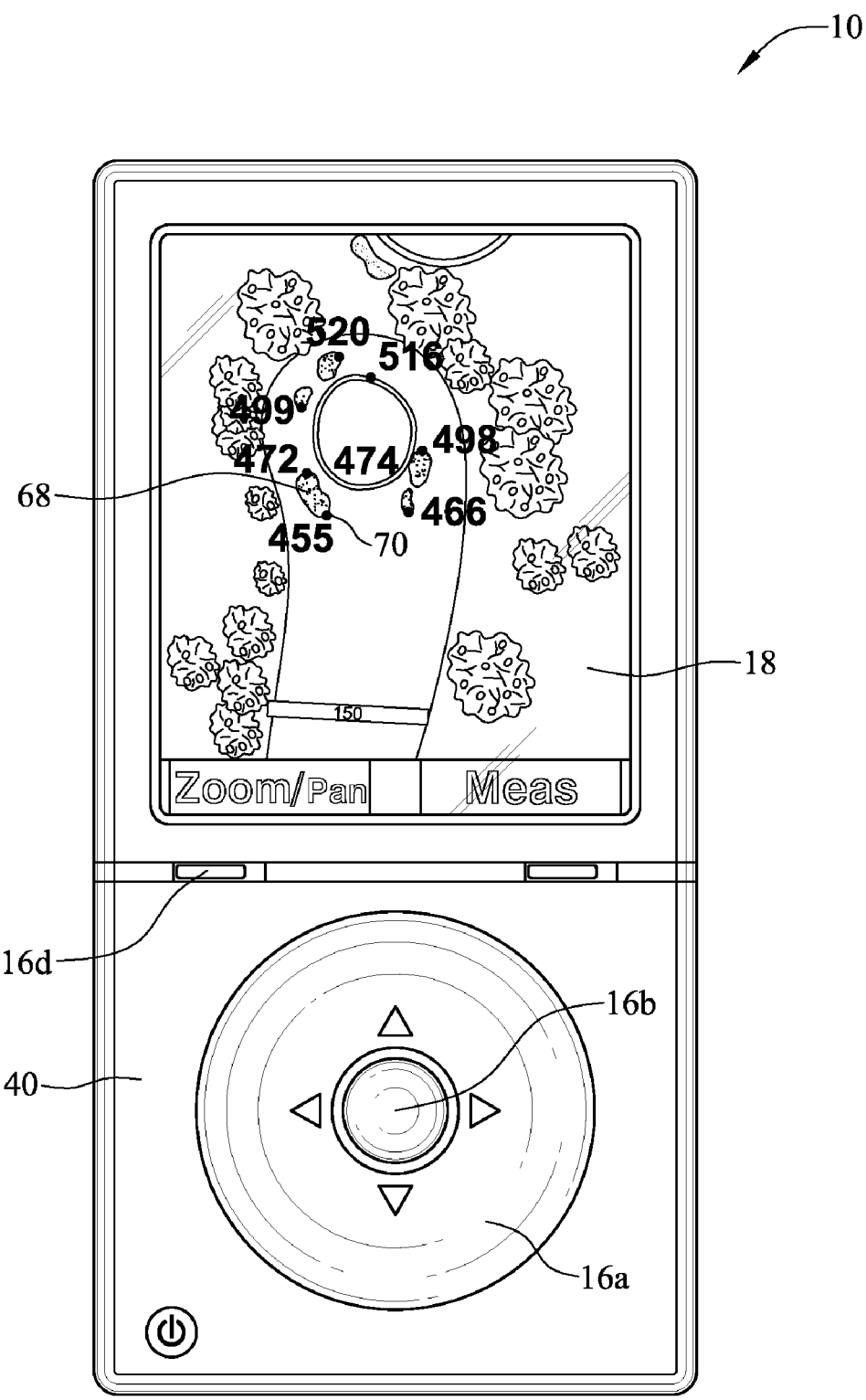
FIG. 8 is front, elevational view of a GPS device with another Pro Mode view displayed on the display according to one embodiment of the present invention.

As described above, the GPS device 10 may be configured to display the golf hole information in two distinct operating modes. The first mode is the Basic Mode which displays the distances and features in a text and/or icon format. In the second mode, referred to herein as the Pro Mode, the distances and features are shown on the display on a graphical image of a relevant area (also referred to as a "viewport") of the golf course. Examples of the Pro Mode showing the same information as the display shown in FIG. 6 are shown in FIGS. 7 and 8. The graphical image is preferably a photographic image generated from geo-referenced (e.g. coordinates are available for substantially any location on the image) satellite or aerial digital photographs, or geo-referenced, generated images. In Pro Mode, the images of the features, such as bunkers, the green, water hazards, etc. are displayed in the photographic image and the distances are overlaid onto the image. A distance marker 70, such as a red dot or other small but easily viewable symbol, is placed on the feature at the exact point of measurement, and the distance number is displayed in close proximity to the marker 70. Referring to the example of FIG. 7, the right fairway bunker 66 is 248 yards to reach and 264 yards to carry. This is exactly the same distance information shown in the display depicted in FIG. 6. Likewise, as shown in FIG. 8, the left greenside bunker 68 is 455 yards to the front and 472 yards to the back.

As explained above, the golf course data for both the Pro Mode and the Basic Mode is the same, except that the golf course images are required for the Pro Mode. Thus, if the Pro Mode course data has been loaded onto the device, the device is configured such that it can toggle back and forth between the Pro Mode display and the Basic Mode display. One of the buttons, such as button 16*e* or 16*f* (see FIG. 2), may be set up to toggle between the Pro Mode and the Basic Mode. However, if only the Basic Mode course data has been loaded onto the device, only the Basic Mode information may be displayed.

While viewing a list of features in Basic Mode, a feature may be selected, such as by scrolling through the list of features as shown in FIG. 6, and the user may select to view the Pro Mode display of such feature simply by selecting the feature from the list and selecting the Pro Mode. Of course, this feature would only be available if the Pro Mode course data has been loaded onto the device.

In order to optimize the viewability of the golf course images and displayed distances in the Pro Mode on a relatively small display 18, the golf GPS device 10 may include a automatic, dynamic, viewport generation method. The ability to miniaturize the size of the device 10 is in many ways limited by the size of the display 18, the major tradeoff being the desire to maximize the size of the display 18 in order to be able to display as much information and images at an easily viewable scale, while at the same time keeping the overall size of the device 10 as small as possible. Intelligent generation of the of the images and numbers being displayed can help to display the most relevant section of the golf hole being played with distances displayed at a font size that is easily readable.

The viewport generation may include one or more methods to determine the displayed viewport. First, the viewport generation method may include a method of determining the location and scale of the image of the golf course to be displayed based on the location of the device (and therefore the location of play) and the characteristics of the golf hole. For example, the method of viewport generation method displays the section of the golf hole that will be most relevant to the golfer from the current location, which may be a yardage range such as the fairway which is between 150 and 250 yards from the current location. As one specific example, FIG. 7 shows a viewport which might be displayed if the user is on the tee box of the displayed hole. The viewport displays the fairway and area surrounding the fairway from about 200 yards to 375 yards from the tee. The graphic image is automatically scaled (i.e. the zoom level is set) to display the relevant section of the hole so that it will fit on the display while maintaining viewability of relevant features (e.g. the bunkers) and distance to the fairway bunker. If the hole happens to be a par 3, or there is less than a certain distance (e.g. 250 yards) to the end of the hole, then the viewport generation method may display the rest of the hole at a maximum zoom level that can fit the rest of the hole on the display (see e.g. FIG. 8).

In another method of viewport generation, the distances displayed may be adjusted to avoid overlapping. This method may also be referred to as collision management. At certain zoom levels, for example very low zoom levels, many features as displayed on the display may be very close together such that if all of the distances to these features are displayed the numbers will overlap and the readability of the information will be compromised. To avoid this, the method will not display some of the distances so as to avoid any overlapping distances. The determination of the distances which will not be displayed, so as to avoid overlap, may be determined based on a hierarchy of the features, a random determination, a predetermination contained in the course data, an algorithm which determines the most important distances, some other criteria, or a combination of these methods. In another aspect of this feature, the method can be configured such that the user may select to display some or all of the non-displayed distances in which case the previously displayed distances which overlap these non-displayed distances are turned off. This selection may be a toggle, so that the user can toggle back and forth between the distances displayed. If there are more than two distances which would conflict with each other if displayed simultaneously, this user selection can advance through each of the non-displayed distances until all of the distances can be displayed sequentially, while the other conflicting distances are turned off.

Figure 9:
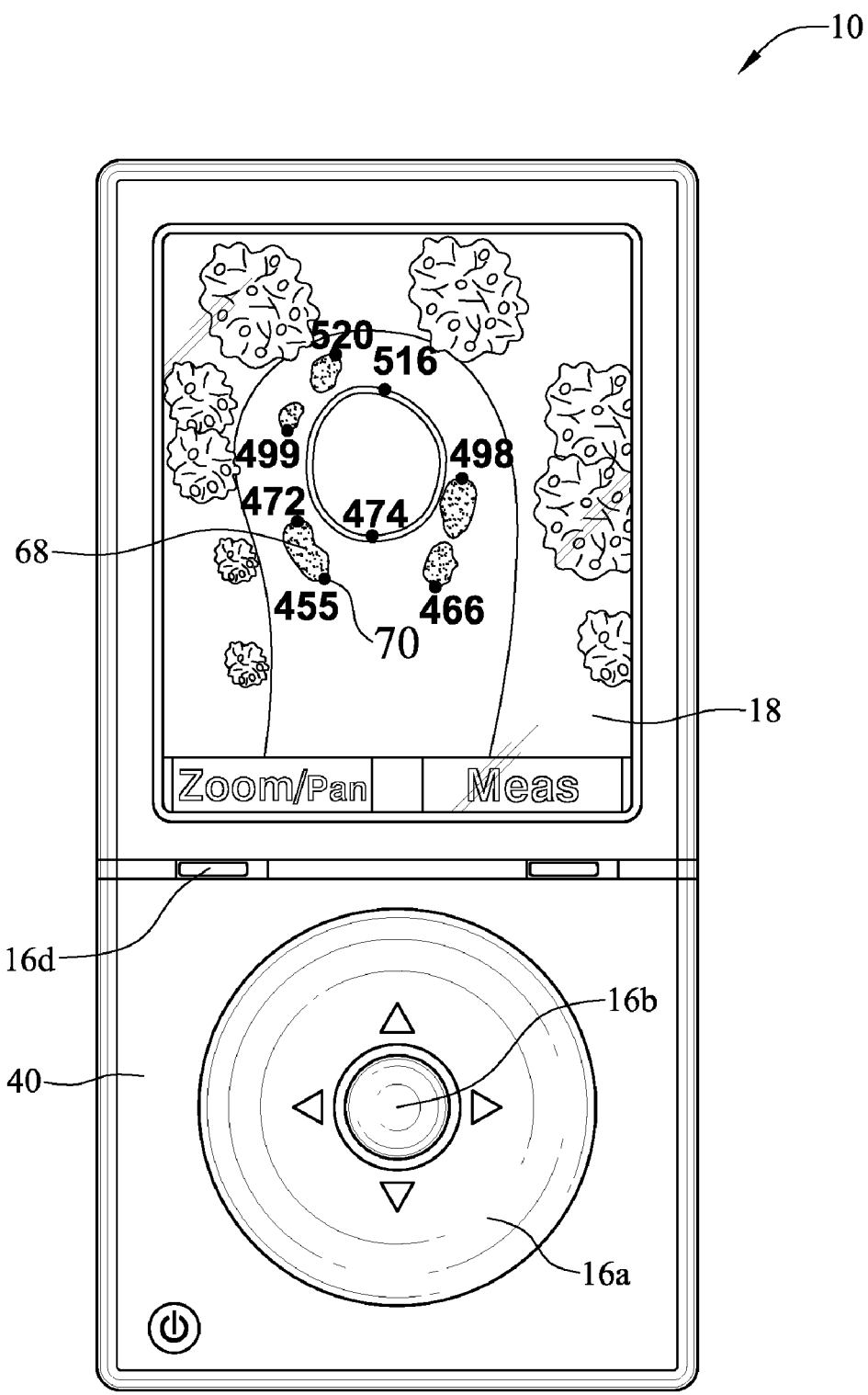
FIG. 9 is front, elevational view of a GPS device with a zoomed in Pro Mode view displayed on the display according to one embodiment of the present invention.

The GPS device 10 may also pan and zoom the displayed graphical images of the golf course with the distance overlays in Pro Mode. Referring to FIG. 8, an example of a green view at a low zoom level is shown. The device 10 is shown in "Zoom" mode which is indicated by the "Zoom/Pan" toggle selection at the bottom left corner of the display 18. To zoom "in" on the image being displayed, the "up" arrow on the directional pad 16a is pushed, as shown in FIG. 9. To zoom "out", the "down" arrow on the directional pad 16a is pushed. The device 10 may be configured such that holding down the "up" or "down" arrow will continue to zoom "in" or "out," respectively. To switch to "Pan" mode as shown in FIG. 9, the button 16d is pushed. The user can pan the displayed image by pressing the desired direction of pan on the directional pad 16a. When zooming or panning, the distances again remain overlaid at the correct locations next to their respective features (or feature marker) and at the pre-set font size.

Figure 10:
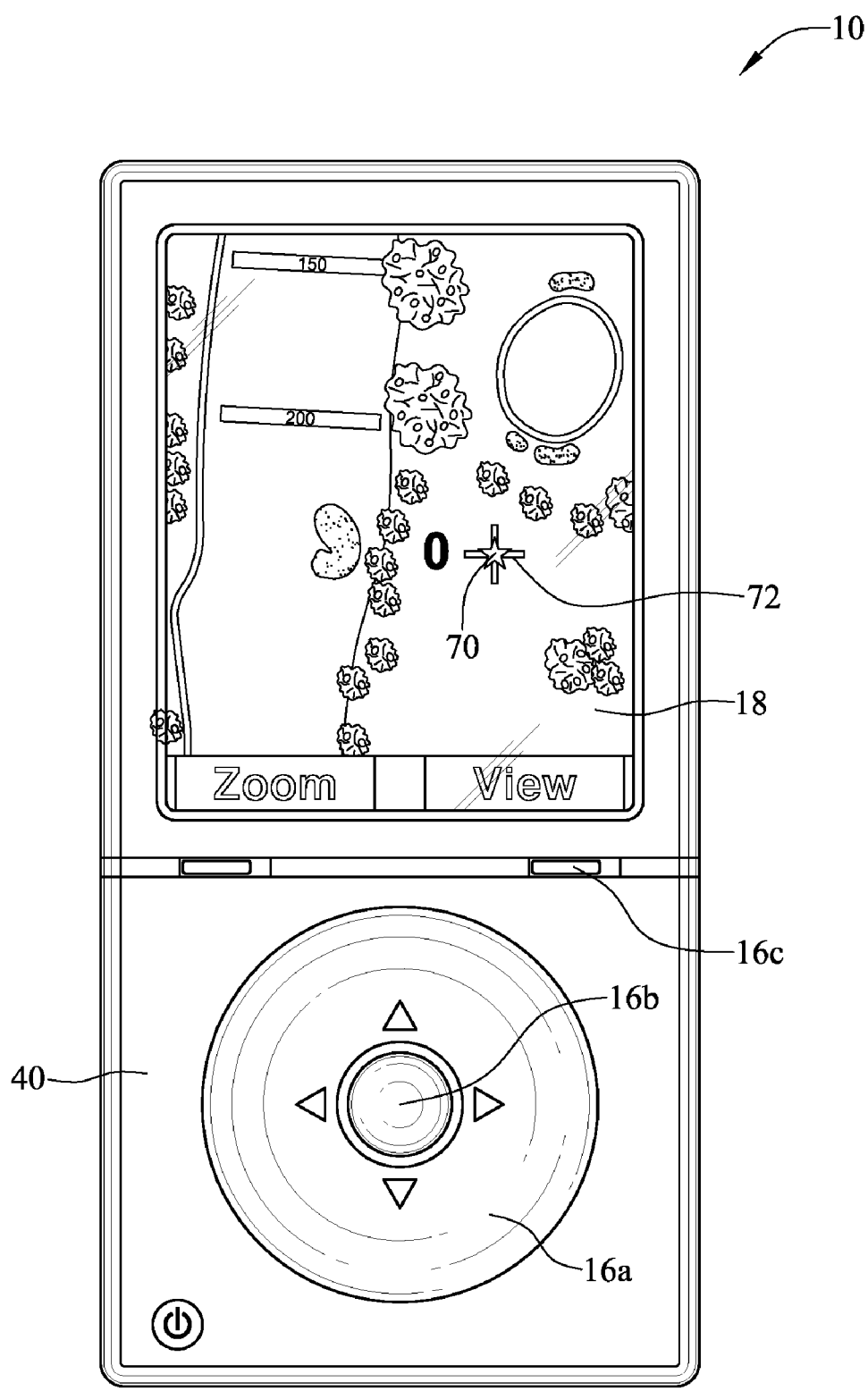
FIG. 10 is front, elevational view of a GPS device in a Measure mode displayed on the display according to one embodiment of the present invention.
Figure 11:
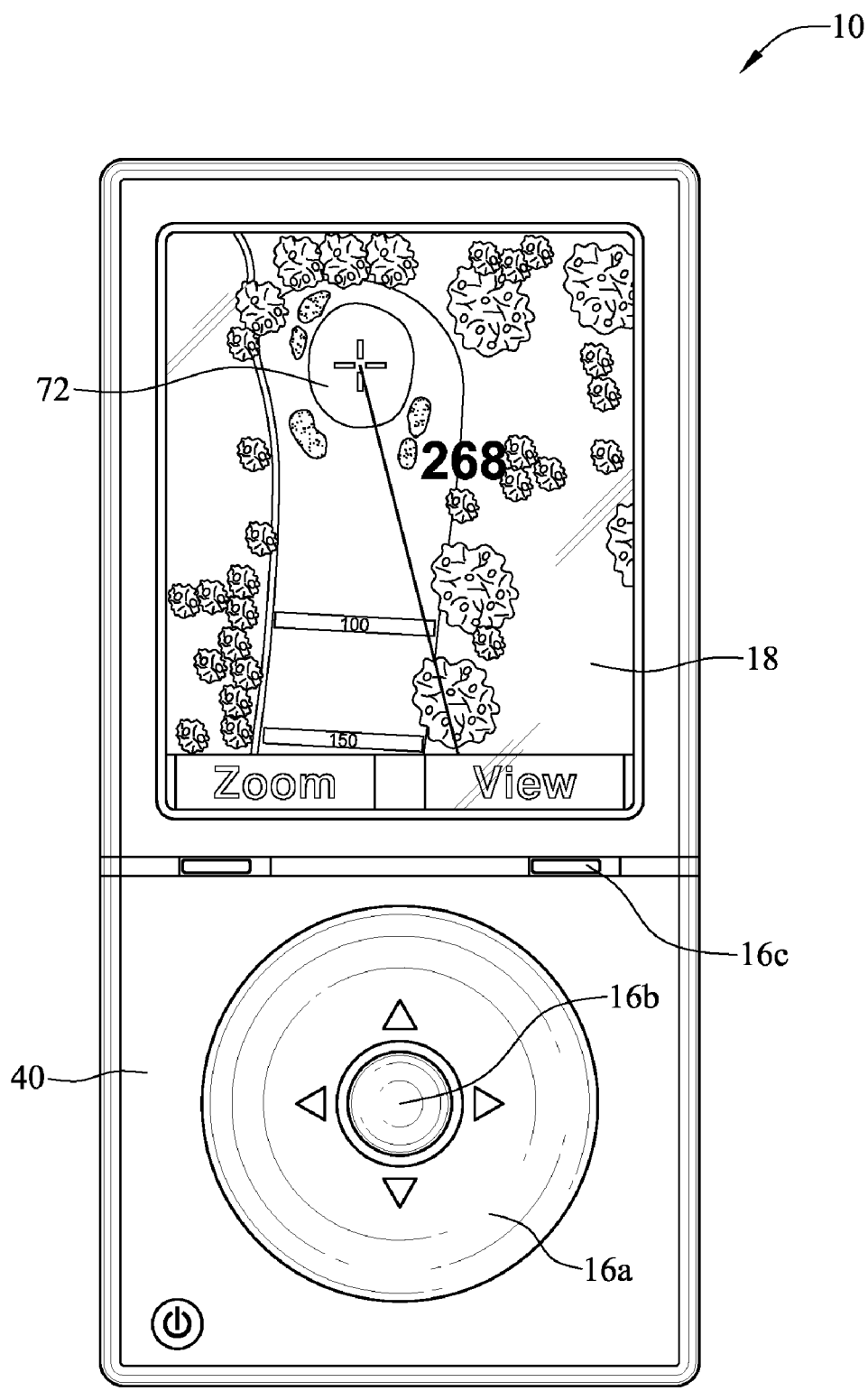
FIG. 11 is front, elevational view of a GPS device with another aspect of the Measure mode displayed on the display according to one embodiment of the present invention.

The golf GPS device 10 may also be configured to measure the distance between locations on the golf course using the images displayed on the display. In order to measure a distance from the location of the device to a location as viewed on image on the display, the "Meas" button 16c is selected (see FIG. 9), to enter "Measure" mode as shown in FIG. 10. A cursor 70 (such as a "+") and a marker 72 (such as the star shown in FIG. 10) will appear at the current location of the device 10. The marker 70 indicates the current location of the device 10, and the cursor indicates the point being measured to. At the outset, the marker 70 and cursor 72 are at the same location, so the distance is displayed as "0". The directional pad is then used to move the cursor 72 to the location of interest. As the cursor 72 is moved, the distance between the cursor 72 and the marker 70 is calculated and displayed. As the cursor 72 reaches the edge of the display in the direction of interest, the display may automatically pan (and/or zoom), as shown in FIG. 11. When the cursor is located at the location of interest, the desired distance will be displayed, as shown in the example of FIG. 11. In a similar manner, the device 10 may also be configured to measure the distance between two locations of interest selected on display. The user simply selects the "Meas" mode. The cursor 72 is then positioned at a first point of interest, the button 16b is pushed to set the first point of interest, and then the cursor 72 is moved to a second point of interest. As in the example above, the distance between selected first point of interest and the location of the cursor will be updated and displayed as the cursor is moved. The distance between a first location for the device 10 and a second location of the device 10 may also be measured by simply entering the "Meas" mode and then moving the device 10 to a new location. As the device 10 is moved, the distance between the original location of the device 10 and the new location of the device 10 will be calculated and displayed. The pan and zoom functions may be utilized automatically or manually during any of the above described measurement modes in order to select a location of interest. In other words, as the cursor reaches the edge of the viewing area, the image will pan (and/or zoom "out") to display a portion of the image that was previously outside the viewing area.

In order to improve the accuracy of the device, the golf GPS device 10 also includes a calibration method which corrects for local errors in the GPS system. Because the golf course images utilized on the device 10 are accurately geo-referenced with global coordinates, every discernable feature on the golf course images is a potential calibration point. To perform the calibration, referring to FIG. 4, the "Calibrate GPS" mode is selected. The use then locates a physical feature at the golf course which can also be fairly accurately identified and located on a graphical image of the same physical feature shown on the display of the GPS device 10. As examples, the calibration feature may be a cart path intersection, a distinctive shape of a bunker, a manhole cover, or a permanent tee marker. The GPS device 10 is then placed at the physical feature, and then the user places a cursor shown on the display of the device onto the image of the same physical feature. It may be helpful to zoom in to a high zoom level or even the maximum zoom level of the physical feature to improve the precision of the location of the cursor. The device 10 then determines the offset between the apparent location measured by the GPS device 14 and the location of the physical feature on the displayed image. The resultant offset is then used to correct all the GPS readings for the round of golf.

The golf GPS device 10 of the present invention may also be configured to present a pre-round preview of a golf course. The golf GPS device 10 allows the user the load a desired golf course and then navigate around the course, such as hole by hole. The preview may include a display of each hypothetical shot which might be take for each hole and/or suggested strategy for playing each hole and/or shot. For instance, the preview mode may display pre-loaded hypothetical shots which are automatically generated or contained within a golf course data package; or the preview mode may use distances typical of the user's club distances, or a distance as selected by the user for each shot, to perform a shot-by-shot preview. A golf game may be implemented on the golf GPS device 10, in which the user can play a game of golf on the desired golf course, similar to other golf video games like "Tiger Woods PGA Tour" or "Mario Golf", in which the game will be played on the actual golf course images stored on the device 10.

Similar to the pre-round preview feature, the golf GPS device 10 may be configured to track each shot taken by the user during a round of golf, including the club used for each shot and other shot information (such as quality and condition of lie, degree of swing such as full shot, half shot, etc., quality of contact, ball flight, etc.). At each ball position during a round of golf, the device 10 is configured to receive an input of the shot information and store the shot information referenced to the location of the device 10. With this stored information, the device 10 may also be configured to play back a round of golf which was tracked using the device, and/or download the tracked round to a computer or other device for playback and/or analysis.

In order to facilitate the entry of commands and information into the device, the golf GPS device 10 may include voice recognition/navigation utilizing the voice recognition unit 22. Indeed, voice recognition for inputting commands and information can be absolutely critical in enabling the timely use of many advanced features, such as shot tracking and score keeping, for example. Without voice recognition, such advanced features would be far too cumbersome and time consuming on a golf course. Moreover, voice recognition also enables the small form factor of the present invention because it avoids the need for a larger, more complicated input device, which might otherwise be necessary to quickly access and use certain advanced functions. For instance, additional input buttons and/or menus may be required to provide fast and easy use of advanced features which can have many options and/or possible input data.

Several examples of the use of the voice recognition capability follow. The golf GPS device 10 may be configured to allow a user to enter shot information while using the shot tracking mode using vocal inputs, or to enter scores on each hole. For instance, when entering a club selection for shot tracking, the user simply enters the voice mode and speaks into the device, "seven iron" or "driver", or whatever club is being used. For score keeping, the device 10 can be configured to recognize a player's name vocally input into the device, and then the score for a hole for such player. Thus, a user need only activate the voice recognition, then state the player's name and score in order to input the score for a player (e.g. "John, six;" Jerry, four"). The device 10 determines the name and score from the voice input, and then stores the data. The score data can then be displayed on the display 18. The voice recognition feature may also be used to audibly enter commands, such as switching between Basic Mode and Pro Mode, navigating through the devices menus, changing the settings, or any other command within the devices menus. Voice recognition facilitates the use of more advanced features, such as shot tracking, by reducing the amount of inputs that must be made using the input device. The use of voice recognition can also allow faster, and simpler access to certain commands/functions by bypassing menus that might normally be encountered when accessing such commands/functions. For example, a screen brightness setting might require going to the "Settings" menu, and then a submenu for "Display" settings, and then a selection of a "Screen Brightness" setting. Instead, the device 10 may be configured to recognize a voice command, such as "Screen Brightness" spoken into the device 10, in which case the device 10 will skip directly to the "Screen Brightness" setting. Of course, the device 10 could be configured to directly perform any of the functions of the device 10 using a voice command.

The golf GPS device of the present invention may include any one or more of the features and functions described above, or any combination of such features and functions which are not by their nature mutually exclusive.

The viewport on the device can be considered to be in one of three different states: normal, zoom-out and zoom-in. In the zoom-in state, there are no collisions to avoid so there is no need for the collision avoidance function of the device in the zoom-in state.

Figure 12:
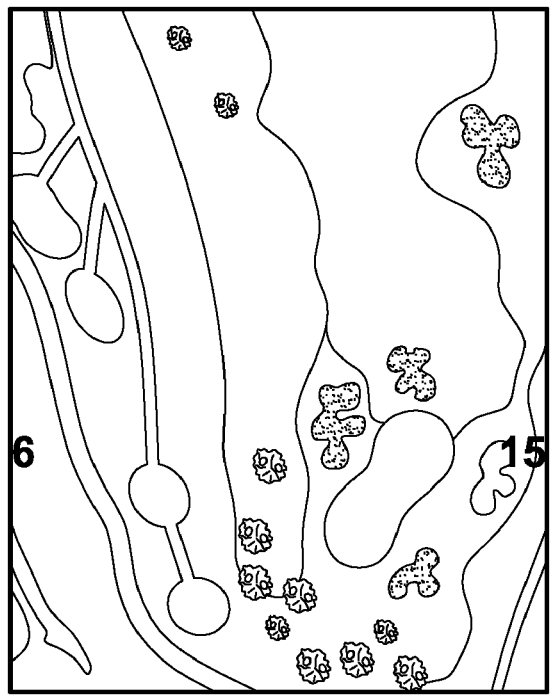
FIG. 12 is an isolated view of a display on a viewport of a device.
Figure 13:
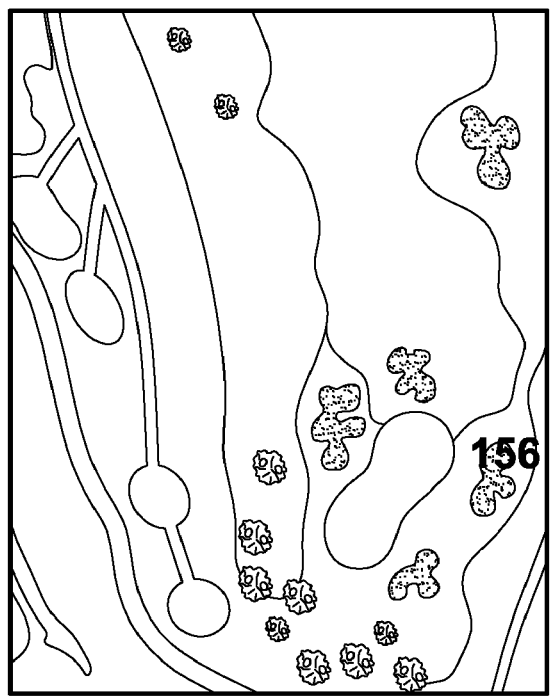
FIG. 13 is an isolated view of a display on a viewport of a device.

In the normal pan state, there are some boundary conditions descriptions for handling which are shown in FIGS. 14-17. If the coordinate position where the text is to be displayed is at the right edge of the screen, such as shown in FIG. 12, such that the entire text string length cannot be accommodated then this co-ordinate has to be shifted to the left by amount of pixels so that the text can be completely displayed such as shown in FIG. 13. The first coordinate position to be plotted will not have any problem w.r.t text collision. This co-ordinate position will be stored for future reference. When the next coordinate position is checked, there is a check for text rectangle overlap of the current text and the previous text. If there is no overlap then display the current text at the same coordinate position. If there is overlap then check the direction in which there is minimum overlap—x or y direction. Move the current text by a pixel distance (the overlap+1-2 pixels) in this minimum overlap direction. After the display this coordinate will again be stored.

Figure 14:
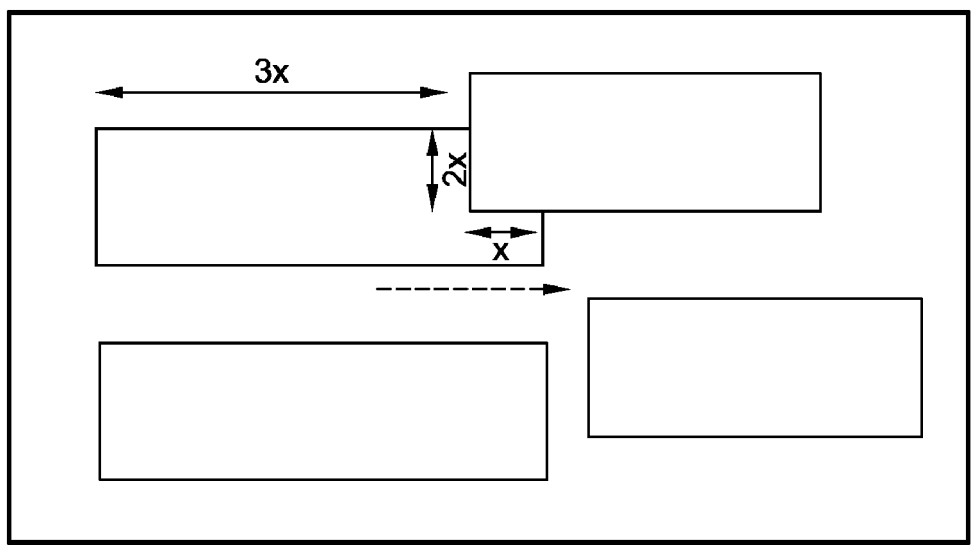
FIG. 14 is a block diagram of the coordinate positioning for collision avoidance on a device when the minimal distance is on the x-axis and the shift is to the right side.

FIG. 14 illustrates the collision avoidance when the minimal distance is on the x-axis and the shift is to the right side.

Figure 15:
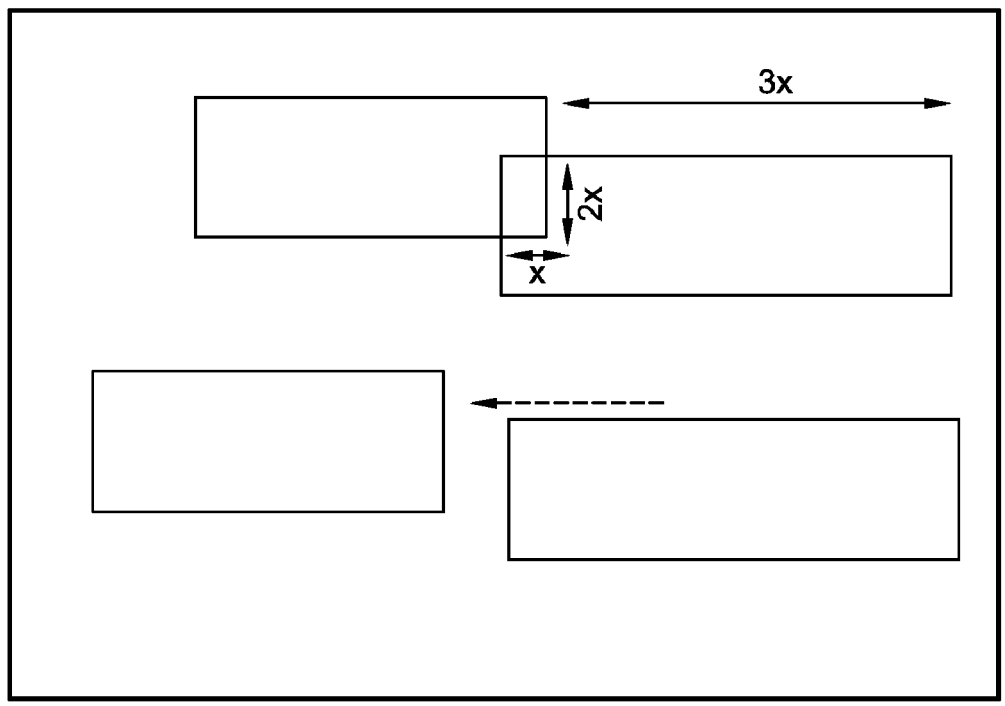
FIG. 15 is a block diagram of the coordinate positioning for collision avoidance on a device when the minimal distance is on the x-axis and the shift is to the left side.

FIG. 15 illustrates the collision avoidance when the minimal distance is on the x-axis and the shift is to the left side.

Figure 16:
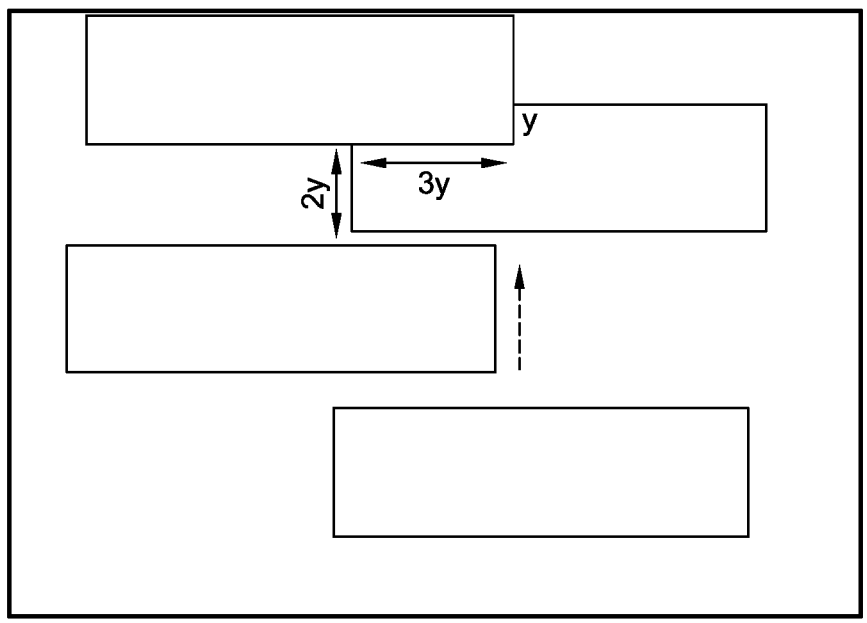
FIG. 16 is a block diagram of the coordinate positioning for collision avoidance on a device when the minimal distance is on the y-axis and the shift is to the top.

FIG. 16 illustrates the collision avoidance when the minimal distance is on the y-axis and the shift is to the top.

Figure 17:
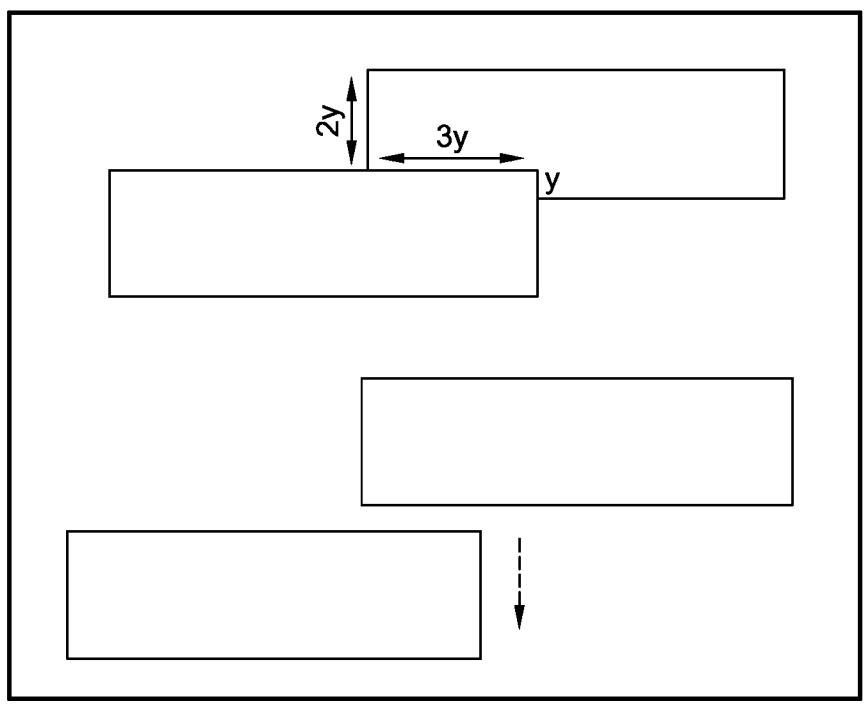
FIG. 17 is a block diagram of the coordinate positioning for collision avoidance on a device when the minimal distance is on the y-axis and the shift is to the bottom.

FIG. 17 illustrates the collision avoidance when the minimal distance is on the y-axis and shift is to the bottom.

Figure 18:
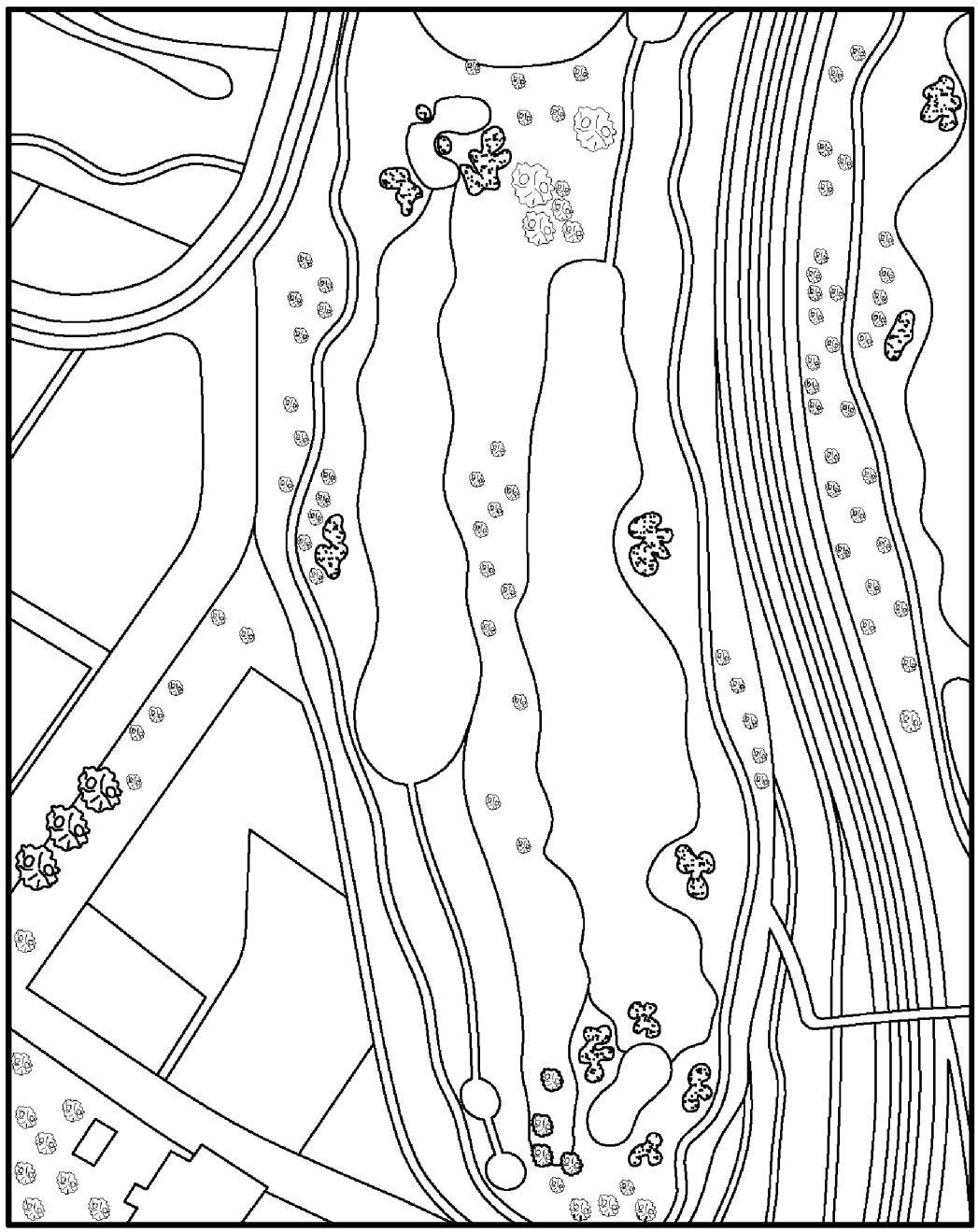
FIG. 18 is an isolated view of a display on a viewport of a device in a zoom-out state.

FIG. 18 is an isolated view of a display on a viewport of a device in a zoom-out state.

If the collision occurs at the top-right corner or bottom-left corner or bottom-right corner or at top-left corner, wherein it cannot accommodated, the current text after new position calculation (resolving the collision) omits the text display and will only display the marker image in a different color for this overlay point. If the user pans in the appropriate direction the text will be displayed at the new position.

When moving to display the next text, check for collisions with the previous texts that have already been displayed. This will be carried out for all text coming in for display.

In the zoom-out state, collision avoidance is also necessary. At the 20% zoom where in the entire golf image will be on the screen, all the data points will be marked with a marker image in a different color and there will be no text display.

When moving to the next zoom level (ex. 30%) then show only some text and omit the rest for which collisions cannot be resolved—these will be shown with the marker image in a different color. The above will be repeated as the user zooms out further such as 40%, then to 50%, etc.

Figure 19:
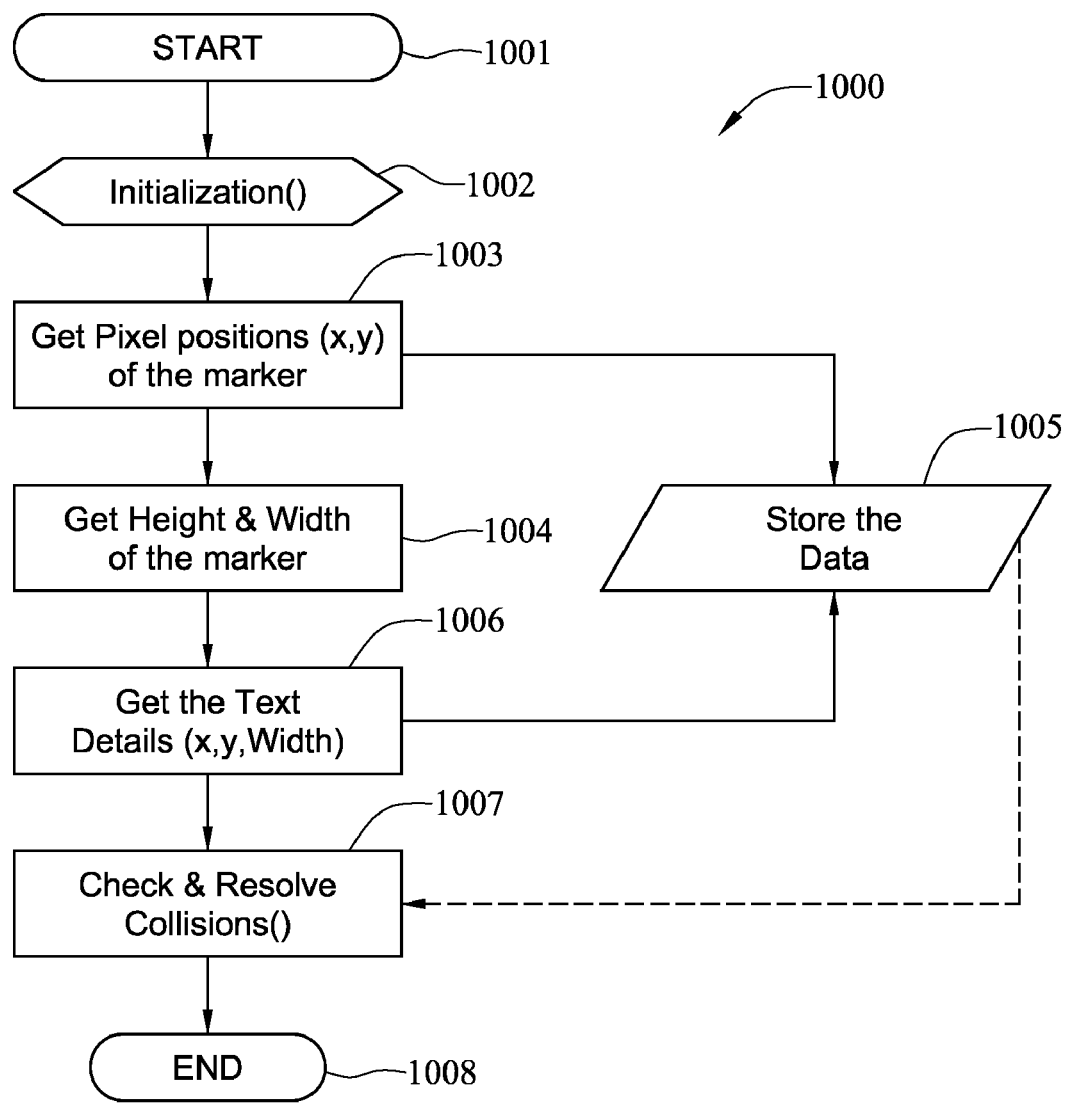
FIG. 19 is a flow chart of a method for the interface of application programming interfaces exposed to a graphical user interface.
Figure 20:
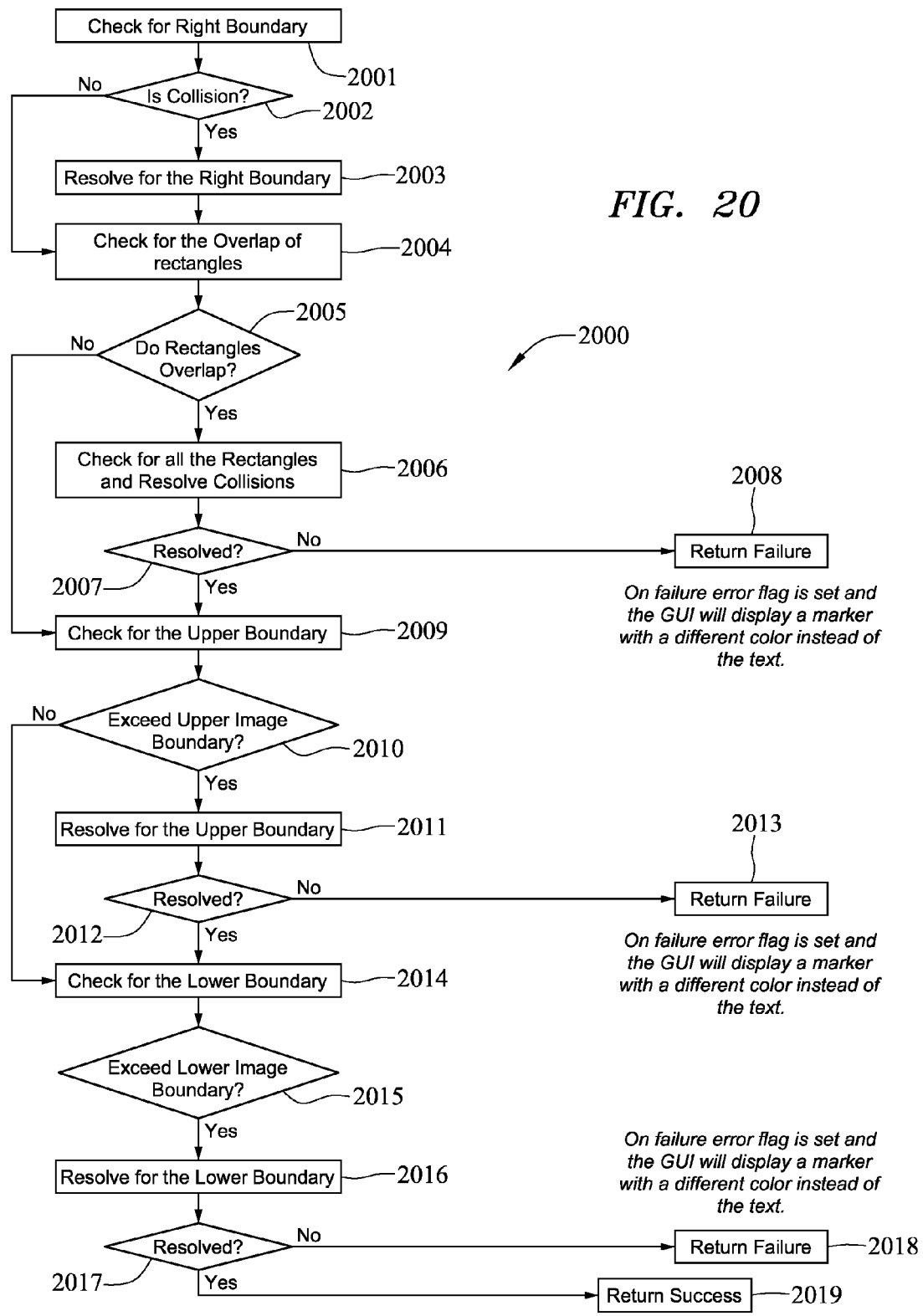
FIG. 20 is a flow chart of a method for collision avoidance on a device.

A flow chart for method 1000 is shown in FIG. 19. At block 1001, start the method. At block 1002, initialization. At block 1003, get the pixel position (x,y) of the marker. At block 1004, get the height and width of the marker. At block 1005, the data is stored. At block 1006, get the text details (x,y, width). At block 1007, check and resolve collisions. At block 1008, end the method.

At block 2001, the device checks for the right boundary. At decision block 2002, an inquiry is made to determine if there is a collision. If yes, then at block 2003 the device resolves for the right boundary. At block 2004, the device checks for the overlap of rectangles. If no at decision block 2002, then the device also checks for overlap of rectangles. At decision block 2005, an inquiry is made to determine if the rectangles overlap. At block 2006, the device checks for all the rectangles and resolve collisions. At block 2007 Resolved? At block 2008 Return Failure. At block 2009 Check for the Upper Boundary. At block 2010 Exceed Upper Image boundary? At block 2011 Resolve for the upper boundary. At block 2012 Resolved? At block 2013 Return Failure. At block 2014

Check for the Lower Boundary. At block 2015 Exceeds Lower Image boundary? At block 2016 Resolve for the lower boundary. At block 2017 Resolved? At block 2018 Return Failure. At block 2019 Return Success.

The foregoing illustrated and described embodiments of the invention are susceptible to various modifications and alternative forms, and it should be understood that the invention generally, as well as the specific embodiments described herein, are not limited to the particular forms or methods disclosed, but also cover all modifications, equivalents and alternatives falling within the scope of the appended claims. The invention, therefore, should not be limited, except to the following claims, and their equivalents.

We claim as our invention the following:

1. A golf GPS device comprising:
   a GPS unit;
   a memory for storing a plurality of aerial images of a golf course;
   a display screen for displaying the plurality of aerial images;
   a user input for inputting a plurality of location points on an aerial image of the plurality of aerial images displayed on the display; and
   a processor configured to avoid collision of features on the display, wherein the processor is configured to check a plurality of boundaries of an image displayed on the display screen, determine if there is a collision between a plurality of elements at each of the plurality of boundaries, and resolve for any collision between the plurality of elements at any of the plurality of boundaries including omitting an element of the plurality of elements if necessary to resolve for any collision.

2. The golf GPS device according to claim 1 wherein each of the plurality of aerial images is a satellite photograph.

3. The golf GPS device according to claim 1 wherein each of the plurality of aerial images is an aerial photograph.

4. A golf GPS device comprising:
   a GPS unit;
   a memory for storing a plurality of digital photographs of a golf course;
   a display screen for displaying the plurality of digital photographs of the golf course;
   a user input for inputting a plurality of location points on an aerial image of the plurality of aerial images displayed on the display; and
   a processor configured to check a plurality of boundaries of an image displayed on the display screen, determine if there is a collision between a plurality of elements at each of the plurality of boundaries, and resolve for any collision between the plurality of elements at any of the plurality of boundaries including omitting an element of the plurality of elements if necessary to resolve for any collision.

* * * * *